US012811799B2

(12) United States Patent
Davies et al.

(10) Patent No.: US 12,811,799 B2
(45) **Date of Patent: *Nov. 24, 2026**

(54) VERIFICATION OF DATA FIELDS OF BLOCKCHAIN TRANSACTIONS

(71) Applicant: nChain Licensing AG, Zug (CH)

(72) Inventors: Jack Owen Davies, London (GB); Alexander Mackay, London (GB); Craig Steven Wright, London (GB)

(73) Assignee: nChain Licensing AG, Zug (CH)

( * ) Notice: Subject to any disclaimer, the term of this patent is extended or adjusted under 35 U.S.C. 154(b) by 148 days.

This patent is subject to a terminal disclaimer.

(21) Appl. No.: 18/660,079

(22) Filed: May 9, 2024

(65) Prior Publication Data

US 2024/0297794 A1 Sep. 5, 2024

Related U.S. Application Data

(63) Continuation of application No. 17/613,164, filed as application No. PCT/IB2020/053813 on Apr. 22, 2020, now Pat. No. 12,034,859.

(30) Foreign Application Priority Data

May 24, 2019 (GB) ..................................... 1907349

(51) Int. Cl.
*H04L 29/06* (2006.01)
*H04L 9/32* (2006.01)
*H04L 9/00* (2022.01)

(52) U.S. Cl.
CPC .............. *H04L 9/3239* (2013.01); *H04L 9/50* (2022.05)

(58) Field of Classification Search
CPC ..................................................... H04L 9/3239
See application file for complete search history.

(56) References Cited

U.S. PATENT DOCUMENTS

2018/0152442 A1 5/2018 Buldas et al.
2018/0343128 A1* 11/2018 Uhr ....................... H04L 9/3265
(Continued)

FOREIGN PATENT DOCUMENTS

KR 1020190043071 A 4/2019
WO 2018164695 A1 9/2018

OTHER PUBLICATIONS

"Bitcoin Developer Guide," bitcoin developer, May 11, 2015, [retrieved on Oct. 29, 2018], retrieved from the Internet: URL: https://web.archive.org/web/20150511232019/https://bitcoin.org/en/developer-guide, 48 pages.
(Continued)

*Primary Examiner* — Jason K Gee
(74) *Attorney, Agent, or Firm* — Galvani Smith PLLC; Rowan P. Smith

(57) ABSTRACT

A computer-implemented method of generating a secondary transaction identifier of a target transaction which enables a querying user to determine whether the target transaction comprises a candidate data field. The method comprises identifying a set of data fields of the target transaction, each data field comprising respective data of the transaction; and generating a transaction hash tree. Each data field is hashed to generate a respective one of a plurality of leaf hashes of the transaction hash tree. The root hash of the transaction hash tree comprises the secondary transaction identifier.

6 Claims, 8 Drawing Sheets

(56) References Cited

U.S. PATENT DOCUMENTS

| | | | | |
|---|---|---|---|---|
| 2019/0253240 | A1* | 8/2019 | Treat | H04L 9/3297 |
| 2019/0363892 | A1 | 11/2019 | Wang | |
| 2020/0252216 | A1* | 8/2020 | Sharma | H04L 9/3239 |

OTHER PUBLICATIONS

Extended European Search Report issued in European Application No. 25177981.5, mailed on Aug. 1, 2025, 6 pages.

* cited by examiner

Transaction from Alice to Bob

↓

Validated by running: Alice's locking script (from output of $Tx_0$), together with Alice's unlocking script (as input to $Tx_1$). This checks that $Tx_1$ meets the condition(s) defined in Alice's locking script.

VERIFICATION OF DATA FIELDS OF BLOCKCHAIN TRANSACTIONS

CROSS REFERENCE TO RELATED APPLICATIONS

This application is a continuation of U.S. patent application Ser. No. 17/613,164 filed on Nov. 22, 2021, which is the U.S. National Stage of International Application No. PCT/IB2020/053813 filed on Apr. 22, 2020, which claims the benefit of United Kingdom Patent Application No. 1907349.3, filed on May 24, 2019, the contents of which are incorporated herein by reference in their entireties.

TECHNICAL FIELD

The present disclosure relates to methods for enabling a querying user to verify whether a transaction within a block of a blockchain comprises a candidate data field.

BACKGROUND

A blockchain refers to a form of distributed data structure, wherein a duplicate copy of the blockchain is maintained at each of a plurality of nodes in a peer-to-peer (P2P) network. The blockchain comprises a chain of blocks of data, wherein each block comprises one or more transactions. Each transaction points back to a preceding transaction in a sequence, going back to a genesis block at the beginning of the blockchain. Transactions can be submitted to the network to be included in new blocks by a process known as "mining", which involves each of a plurality of mining nodes competing to perform "proof-of-work", i.e. solving a cryptographic puzzle based on a pool of the pending transactions waiting to be included in blocks.

Conventionally the transactions in the blockchain are used to convey a digital asset, i.e. data acting as a store of value. However, a blockchain can also be exploited in order to layer additional functionality on top of the blockchain. For instance, blockchain protocols may allow for storage of additional user data in an output of a transaction. Modern blockchains are increasing the maximum data capacity that can be stored within a single transaction, enabling more complex data to be incorporated. For instance this may be used to store an electronic document in the blockchain, or even audio or video data.

Each node in the network can have any one, two or all of three roles: forwarding, mining and storage. Forwarding nodes propagate transactions throughout the nodes of the network. Mining nodes perform the mining of transactions into blocks. Storage nodes each store their own copy of the mined blocks of the blockchain. In order to have a transaction recorded in the blockchain, a party sends the transaction to one of the nodes of the network to be propagated. Mining nodes which receive the transaction may race to mine the transaction into a new block. Each node is configured to respect the same node protocol, which will include one or more conditions for a transaction to be valid. Invalid transactions will not be propagated nor mined into blocks. Assuming the transaction is validated and thereby accepted onto the blockchain, the additional user data will thus remain stored at each of the nodes in the P2P network as an immutable public record.

The miner who successfully solved the proof-of-work puzzle to create the latest block is typically rewarded with a transaction called a "generation transaction" generating a new amount of the digital asset. The proof-of work incentivises miners not to cheat the system by including double-spending transactions in their blocks, since it requires a large amount of compute resource to mine a block, and a block that includes an attempt to double spend is likely not be accepted by other nodes.

Each block in a blockchain usually contains a summary of all the transactions in the block. This summary is generated using a "Merkle tree". Merkle trees are hash trees containing cryptographic hashes. The term "Merkle tree" is sometimes used in the literature to refer to a binary hash tree, though the original disclosure by Merkle was not limited to binary hash trees and elsewhere in the literature "hash tree" and "Merkle tree" are used synonymously. The former definition happens to be adopted herein. The term "tree" refers to a branching data structure, the tree having a "root" at the top and "leaves" at the bottom. A Merkle tree is constructed by recursively hashing pairs of nodes until there is only one hash, called the root, or Merkle root. The root hash represents an overall digital fingerprint of the entire set of transactions in a block, providing an efficient process to verify whether a transaction is included in the block. To prove that a specific transaction is included in the block, a node only needs to produce a relatively small number of hashes, constituting an authentication path or "Merkle path" connecting the specific transaction to the root of the tree.

SUMMARY

In most blockchain ecosystems the functions and capabilities of various types of node will be diverse. For instance, a miner is likely to have access to much greater computational resources such that they can store a full copy of the blockchain and verify all incoming transactions, whereas an average user of the blockchain is likely to have a more lightweight client for creating and broadcasting payments.

Merkle trees, or hash trees in general, may be used by nodes to verify that a given transaction was mined into the blockchain. This is referred to in the art as simplified payment verification (SPV), although it is not limited to verifying payment transactions. This verification method usually requires the node (which may be running only a lightweight client) to obtain the full transaction data, hash it and perform a "Merkle proof".

At present the SPV method is suitable for lightweight clients who need to verify the existence of small-size data in the blockchain, such as image files. However, as blockchain ecosystems scale, transaction sizes are likely to increase significantly and with them so too is the size of the arbitrary data packets embedded within them. This is an issue, particularly for lightweight clients, when verifying transactions as the entire transaction needs to be hashed, which means that they may need to retrieve a large (e.g. megabyte or gigabyte) transaction to verify the existence of a much smaller (e.g. kilobyte) data packet within the transaction on the blockchain.

It would therefore be desirable for a node (e.g. a lightweight client) to be able to prove the existence of part of the transaction (e.g. the smaller data packet) without having to obtain the full transaction.

According to one aspect disclosed herein, there is provided a computer-implemented method of generating a secondary transaction identifier of a target transaction, the secondary transaction identifier enabling a querying user to determine whether the target transaction comprises a candidate data field; the method being performed by a generating user and comprising: identifying a set of data fields of the target transaction, each data field comprising respective data of the transaction; and generating a transaction hash tree, wherein the transaction hash tree comprises: i) a leaf layer comprising a plurality of leaf hashes, wherein each data field is hashed to generate a respective one of the plurality of leaf hashes, ii) one or more internal layers each comprising a plurality of internal hashes, wherein each internal hash in each internal layer is generated by hashing a concatenation of at least two hashes from a lower layer, each internal hash of a lowermost internal layer of the one or more internal layers being generated by hashing a concatenation of at least two different leaf hashes, and iii) a root layer comprising the secondary transaction identifier, wherein the secondary transaction identifier is generated by hashing a concatenation of the internal hashes of an uppermost internal layer of the one or more internal layers.

The present disclosure recognizes a further way in which Merkle trees, or more generally hash trees, can be exploited to allow nodes (i.e. a querying user) to verify individual data fields of a transaction. A transaction is split (or parsed) into a set of data fields for generating a hash tree, i.e. different parts of the transaction are identified as separate data fields. The root of the hash tree serves as a novel, secondary identifier of the transaction. The querying user, who may for instance only be operating a lightweight client can perform a proof, using the secondary identifier, to prove the existence of (small) data fields in a transaction, without the need to obtain and hash the full transaction data.

The secondary transaction identifier may be generated by any user who has access to the full transaction data. For instance, the generating user may be a miner who has received the transaction, a user of the blockchain network (e.g. Alice who has generated the transaction, or indeed a user external to the blockchain network who has been provided with or who can view the transaction.

According to another aspect disclosed herein, there is provided a method of enabling a querying user to determine whether a target transaction within a block of a blockchain comprises a candidate data field; the method being performed by a committing user and comprising: obtaining a secondary transaction identifier of the target transaction; and committing the secondary transaction identifier to a transaction for inclusion within a block of the blockchain, wherein the secondary transaction identifier has been generated by: identifying a set of data fields of the target transaction, each data field comprising respective data of the transaction; and generating a transaction hash tree, wherein the transaction hash tree comprises: i) a leaf layer comprising a plurality of leaf hashes ordered based on the ordered set of data fields, wherein each data field is hashed to generate a respective one of the plurality of leaf hashes, ii) one or more internal layers each comprising a plurality of internal hashes, wherein each internal hash in each internal layer is generated by hashing a concatenation of at least two hashes from a lower layer, each internal hash of a lowermost internal layer of the one or more internal layers being generated by hashing a concatenation of at least two different leaf hashes, and iii) a root layer comprising the secondary transaction identifier, wherein the secondary transaction identifier is generated by hashing a concatenation of the internal hashes of an uppermost internal layer of the one or more internal layers.

The secondary transaction identifier may be stored on-chain for the querying user to access. Additionally or alternatively, the secondary transaction identifier of $Tx_1$ may be recorded in a different transaction $Tx_2$. The secondary transaction identifier may be recorded in a generation transaction by a miner.

Any user can record (i.e. cause to be included on the blockchain) the secondary transaction identifier on-chain. E.g. the miner may include it within a generation transaction of a block (the same block which contains the target transaction or a different block). Alternatively, a party (e.g. Alice) can cause the identifier to be included within a block of the blockchain by transmitting a (valid) transaction that contains the secondary transaction identifier to one or more nodes to be mined to the blockchain.

According to another aspect disclosed herein, there is provided a computer-implemented method of verifying whether a candidate secondary transaction identifier of a target transaction within a block of a blockchain has been generated according to a specified protocol, the method performed by a verifying user and comprising: obtaining the candidate secondary transaction identifier; identifying a set of data fields of the target transaction, each data field comprising respective data of the transaction; generating a transaction hash tree, wherein the transaction hash tree comprises: i) a leaf layer comprising a plurality of leaf hashes, wherein each data field is hashed to generate a respective leaf hash, ii) one or more internal layers each comprising a plurality of internal hashes, wherein each internal hash in each internal layer is generated by hashing a concatenation of at least two hashes from a lower layer, each internal hash of a lowermost internal layer being generated by hashing a concatenation of at least two different leaf hashes, and iii) a root layer comprising the secondary transaction identifier, wherein the secondary transaction identifier is generated by hashing a concatenation of the internal hashes of an uppermost internal layer; and verifying whether the secondary transaction identifier matches the candidate secondary transaction identifier.

This allows any user who has access to the full transaction (e.g. a node of the blockchain network such as a miner) to verify whether the generating user has used the correct protocol (e.g. the correct identifying of the transaction data fields and the correct generation of the hash tree) to generate the secondary transaction identifier. Upon verifying that the recording user has used the correct protocol, the verifying node can attest to that fact, e.g. by informing other blockchain users such as the querying user.

According to another aspect disclosed herein, there is provided a computer-implemented method of determining whether a target transaction within a block of a blockchain comprises a candidate data field, the method being performed by a querying user and comprising: obtaining a candidate leaf hash, wherein the candidate leaf hash is a hash of the candidate data field; obtaining a candidate secondary transaction identifier of the target transaction, wherein the secondary transaction identifier has been generated by identifying a set of data fields of the target transaction, each data field comprising respective data of the transaction, and generating a transaction hash tree, wherein a root layer of the transaction hash tree comprises the secondary transaction identifier; obtaining an authentication path for the candidate data field, wherein the authentication path comprises an ordered set of hashes, and wherein the ordered set of hashes comprises at least one leaf hash and one or more sets of internal hashes, each set of internal hashes belonging to a respective internal layer of the transaction hash tree; and performing a hash tree proof using the obtained candidate leaf hash, the obtained candidate secondary transaction identifier, and the obtained authentication path for the candidate data field, said performing generating a secondary transaction identifier; wherein said determination is based on whether the whether the secondary transaction identifier matches the candidate secondary transaction identifier.

As mentioned above, currently the SPV method is used to verify the existence of a transaction on the blockchain. In that method, each transaction in a block forms a leaf of a hash tree. In contrast, the present disclosure uses individual data fields as leaves of a hash tree to verify the existence of one of those data fields. When N data fields are hashed and summarized in a root hash, the querying user can check to see if any one data field (the candidate data field) is included in the hash tree (and therefore the transaction) by performing a hash tree proof (referred to as a Merkle proof when the hash tree is a Merkle tree). To do this, the querying user is provided with an authentication path, also referred to as a hash tree path (and also referred to as a Merkle path when the hash tree is a Merkle tree). The querying user recursively hashes the candidate data field with successive hashes of the hash tree path until a candidate secondary transaction identifier (the root hash) is generated. The secondary transaction identifier is as unique as the underlying hash function used to generate it. Therefore due to the properties of a hash function, the candidate secondary transaction identifier will only be identical to the secondary transaction identifier of the transaction if the candidate data field is part of that same transaction. If the candidate and obtained secondary transaction identifiers match, the querying user can be confident that the candidate data field forms part of the transaction.

According to another aspect disclosed herein, there is provided a computer-implemented method of generating a secondary block identifier of a block of a blockchain, wherein the block comprises a set of transactions, the secondary block identifier enabling a querying user to determine whether the set of transactions comprises a candidate data field; the method being performed by a generating user and comprising: for each transaction in the set of transactions, obtaining a respective secondary transaction identifier; and generating a transaction set hash tree, wherein the transaction set hash tree comprises: i) a leaf layer comprising a plurality of leaf hashes, wherein each leaf hash corresponds to a respective one of the secondary transaction identifiers, ii) one or more internal layers each comprising a plurality of internal hashes, wherein each internal hash in each internal layer is generated by hashing a concatenation of at least two hashes from a lower layer, each internal hash of a lowermost internal layer of the one or more internal layers being generated by hashing a concatenation of at least two different leaf hashes, and iii) a root layer comprising the secondary block identifier, wherein the secondary block identifier is generated by hashing a concatenation of the internal hashes of an uppermost internal layer of the one or more internal layers.

Here, the respective secondary transaction identifiers of each transaction within a block are used as leaves as a "tree of transaction hash trees". That is, each secondary transaction identifier is itself the root hash of a transaction hash tree. The root of the tree of transaction hash trees (referred to also as transaction set hash tree) acts as a secondary block identifier, as it is compression of all of the transactions within the block. The secondary block identifier may be generated by any user who can obtain (e.g. generate) all of the secondary transaction identifiers. For instance, the generating user may be a miner who has generated the secondary transaction identifiers. Alternatively, a secondary transaction identifier may be extracted from a transaction (e.g. a generation transaction) which includes that secondary transaction identifier.

Note that there are other ways of identifying a block, e.g. a block header, a block height, a block depth, and a block number. However, the term "block identifier" is used throughout to refer to the (Merkle) root of a hash tree. For instance, the secondary block identifier is the root of the tree of transaction trees.

According to another aspect disclosed herein, there is provided a method of enabling a querying user to determine whether a set of transactions within a block of a blockchain comprises a candidate data field; the method being performed by a committing user and comprising: obtaining a secondary block identifier of the block that comprises the set of transactions; and committing the secondary block identifier to a transaction for inclusion within a block of the blockchain, wherein the secondary block identifier has been generated by: for each transaction in the set of transactions, obtaining a respective secondary transaction identifier; and generating a transaction set hash tree, wherein the transaction set hash tree comprises: i) a leaf layer comprising a plurality of leaf hashes, wherein each leaf hash corresponds to a respective one of the secondary transaction identifiers, ii) one or more internal layers each comprising a plurality of internal hashes, wherein each internal hash in each internal layer is generated by hashing a concatenation of at least two hashes from a lower layer, each internal hash of a lowermost internal layer of the one or more internal layers being generated by hashing a concatenation of at least two different leaf hashes, and iii) a root layer comprising the secondary block identifier, wherein the secondary block identifier is generated by hashing a concatenation of the internal hashes of an uppermost internal layer of the one or more internal layers.

Again, any user who has access to the secondary transaction identifiers (e.g. a user who has generated those identifiers) may generate the secondary block identifier. However, only a miner can record the secondary block identifier within a generation transaction of a block.

According to another aspect disclosed herein, there is provided a computer-implemented method of verifying whether a candidate secondary block identifier of a block of a blockchain has been generated according to a specified protocol, wherein the block comprises a set of transactions, wherein the method is performed by a verifying user and comprises: obtaining the candidate secondary block identifier; for each transaction in the set of transactions, obtaining a respective secondary transaction identifier; generating a transaction set hash tree, wherein the transaction set hash tree comprises: i) a leaf layer comprising a plurality of leaf hashes, wherein each leaf hash corresponds to a respective one of the secondary transaction identifiers, ii) one or more internal layers each comprising a plurality of internal hashes, wherein each internal hash in each internal layer is generated by hashing a concatenation of at least two hashes from a lower layer, each internal hash of a lowermost internal layer of the one or more internal layers being generated by hashing a concatenation of at least two different leaf hashes, and iii) a root layer comprising the secondary block identifier, wherein the secondary block identifier is generated by hashing a concatenation of the internal hashes of an uppermost internal layer of the one or more internal layers; and verifying whether the secondary block identifier matches the candidate secondary block identifier.

This allows any user who has access to the whole of each one of the transactions (e.g. a node of the blockchain network such as a miner or storage node) to verify whether the generating user has used the correct protocol (e.g. the correct generation of the transaction set hash tree) to generate the secondary block identifier.

According to another aspect disclosed herein, there is provided a computer-implemented method of determining whether a block of a blockchain comprises a target transaction that comprises a candidate data field, wherein the block comprises a set of transactions including said target transaction, the method being performed by a querying user and comprising: obtaining i) a candidate leaf hash, wherein the candidate leaf hash is a hash of the candidate data field, ii) a candidate secondary transaction identifier of the target transaction, and iii) an authentication path for the candidate data field; performing a hash tree proof using i), ii) and iii) to generate a secondary transaction identifier; obtaining iv) a candidate secondary block identifier, and v) an authentication path for the candidate secondary block identifier; performing a hash tree proof using iv), v) and the generated secondary transaction identifier to generate a secondary block identifier; obtaining vi) a candidate primary transaction identifier of the target transaction, vii) a candidate primary block identifier of the block comprising the set of transactions, and viii) an authentication path for the primary block identifier; and performing a hash tree proof using vi), vii, and viii) to generate a primary block identifier; wherein said determination is based on whether: a) the generated secondary transaction identifier matches the candidate secondary transaction identifier, b) the generated secondary block identifier matches the candidate secondary block identifier, and c) the generated primary block identifier matches the candidate primary block identifier.

Upon confirming that the candidate and generated block identifiers (for each of the primary and secondary versions) match one another, the querying user can be sure that the block, which has been mined into the blockchain, comprises the target transaction, and that the target transaction comprises the candidate data field. This is because both the primary and secondary block identifiers are constructed from the same input data (the transactions), which is trusted due to the proof-of-work consensus.

BRIEF DESCRIPTION OF THE DRAWINGS

To assist understanding of embodiments of the present disclosure and to show how such embodiments may be put into effect, reference is made, by way of example only, to the accompanying drawings in which.

DETAILED DESCRIPTION OF EMBODIMENTS

Figure 1:
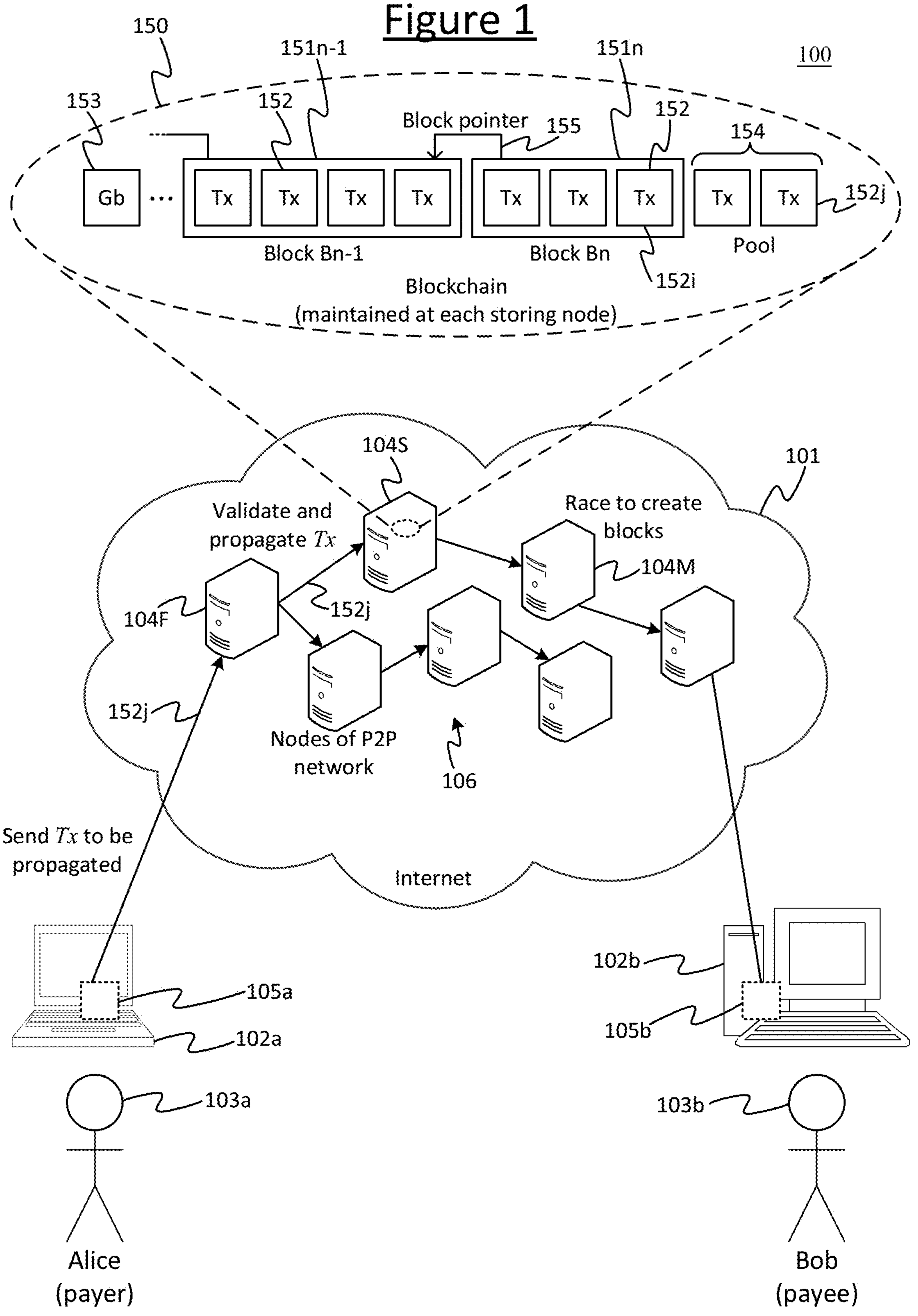
FIG. 1 is a schematic block diagram of a system for implementing a blockchain.

FIG. 1 shows an example system 100 for implementing a blockchain 150 generally. The system 100 comprises a packet-switched network 101, typically a wide-area internetwork such as the Internet. The packet-switched network 101 comprises a plurality of nodes 104 arranged to form a peer-to-peer (P2P) overlay network 106 within the packet-switched network 101. Each node 104 comprises computer equipment of a peers, with different ones of the nodes 104 belonging to different peers. Each node 104 comprises processing apparatus comprising one or more processors, e.g. one or more central processing units (CPUs), accelerator processors, application specific processors and/or field programmable gate arrays (FPGAs). Each node also comprises memory, i.e. computer-readable storage in the form of a non-transitory computer-readable medium or media. The memory may comprise one or more memory units employing one or more memory media, e.g. a magnetic medium such as a hard disk; an electronic medium such as a solid-state drive (SSD), flash memory or EEPROM; and/or an optical medium such as an optical disk drive.

The blockchain 150 comprises a chain of blocks of data 151, wherein a respective copy of the blockchain 150 is maintained at each of a plurality of nodes in the P2P network 160. Each block 151 in the chain comprises one or more transactions 152, wherein a transaction in this context refers to a kind of data structure. The nature of the data structure will depend on the type of transaction protocol used as part of a transaction model or scheme. A given blockchain will typically use one particular transaction protocol throughout. In one common type of transaction protocol, the data structure of each transaction 152 comprises at least one input and at least one output. Each output specifies an amount representing a quantity of a digital asset belonging to a user 103 to whom the output is cryptographically locked (requiring a signature of that user in order to be unlocked and thereby redeemed or spent). Each input points back to the output of a preceding transaction 152, thereby linking the transactions.

At least some of the nodes 104 take on the role of forwarding nodes 104F which forward and thereby propagate transactions 152. At least some of the nodes 104 take on the role of miners 104M which mine blocks 151. At least some of the nodes 104 take on the role of storage nodes 104S (sometimes also called "full-copy" nodes), each of which stores a respective copy of the same blockchain 150 in their respective memory. Each miner node 104M also maintains a pool 154 of transactions 152 waiting to be mined into blocks 151. A given node 104 may be a forwarding node 104, miner 104M, storage node 104S or any combination of two or all of these.

In a given present transaction 152*j*, the (or each) input comprises a pointer referencing the output of a preceding transaction 152*i* in the sequence of transactions, specifying that this output is to be redeemed or "spent" in the present transaction 152*j*. In general, the preceding transaction could be any transaction in the pool 154 or any block 151. The preceding transaction 152*i* need not necessarily exist at the time the present transaction 152*j* is created or even sent to the network 106, though the preceding transaction 152*i* will need to exist and be validated in order for the present transaction to be valid. Hence "preceding" herein refers to a predecessor in a logical sequence linked by pointers, not necessarily the time of creation or sending in a temporal sequence, and hence it does not necessarily exclude that the transactions 152*i*, 152*j* be created or sent out-of-order (see discussion below on orphan transactions). The preceding transaction 152*i* could equally be called the antecedent or predecessor transaction.

The input of the present transaction 152*j* also comprises the signature of the user 103*a* to whom the output of the preceding transaction 152*i* is locked. In turn, the output of the present transaction 152*j* can be cryptographically locked to a new user 103*b*. The present transaction 152*j* can thus transfer the amount defined in the input of the preceding transaction 152*i* to the new user 103*b* as defined in the output of the present transaction 152*j*. In some cases a transaction 152 may have multiple outputs to split the input amount between multiple users (one of whom could be the original user 103*a* in order to give change). In some cases transaction can also have multiple inputs to gather together the amounts from multiple outputs of one or more preceding transactions, and redistribute to one or more outputs of the current transaction.

The above may be referred to as an "output-based" transaction protocol, sometimes also referred to as an unspent transaction output (UTXO) type protocol (where the outputs are referred to as UTXOs). A user's total balance is not defined in any one number stored in the blockchain, and instead the user needs a special "wallet" application 105 to collate the values of all the UTXOs of that user which are scattered throughout many different transactions 152 in the blockchain 151.

An alternative type of transaction protocol may be referred to as an "account-based" protocol, as part of an account-based transaction model. In the account-based case, each transaction does not define the amount to be transferred by referring back to the UTXO of a preceding transaction in a sequence of past transactions, but rather by reference to an absolute account balance. The current state of all accounts is stored by the miners separate to the blockchain and is updated constantly. In such a system, transactions are ordered using a running transaction tally of the account (also called the "position"). This value is signed by the sender as part of their cryptographic signature and is hashed as part of the transaction reference calculation. In addition, an optional data field may also be signed the transaction. This data field may point back to a previous transaction, for example if the previous transaction ID is included in the data field.

With either type of transaction protocol, when a user 103 wishes to enact a new transaction 152*j*, then he/she sends the new transaction from his/her computer terminal 102 to one of the nodes 104 of the P2P network 106 (which nowadays are typically servers or data centres, but could in principle be other user terminals). This node 104 checks whether the transaction is valid according to a node protocol which is applied at each of the nodes 104. The details of the node protocol will correspond to the type of transaction protocol being used in the blockchain 150 in question, together forming the overall transaction model. The node protocol typically requires the node 104 to check that the cryptographic signature in the new transaction 152*j* matches the expected signature, which depends on the previous transaction 152*i* in an ordered sequence of transactions 152. In an output-based case, this may comprise checking that the cryptographic signature of the user included in the input of the new transaction 152*j* matches a condition defined in the output of the preceding transaction 152*i* which the new transaction spends, wherein this condition typically comprises at least checking that the cryptographic signature in the input of the new transaction 152*j* unlocks the output of the previous transaction 152*i* to which the input of the new transaction points. In some transaction protocols the condition may be at least partially defined by a custom script included in the input and/or output. Alternatively it could simply be a fixed by the node protocol alone, or it could be due to a combination of these. Either way, if the new transaction 152*j* is valid, the current node forwards it to one or more others of the nodes 104 in the P2P network 106. At least some of these nodes 104 also act as forwarding nodes 104F, applying the same test according to the same node protocol, and so forward the new transaction 152*j* on to one or more further nodes 104, and so forth. In this way the new transaction is propagated throughout the network of nodes 104.

In an output-based model, the definition of whether a given output (e.g. UTXO) is spent is whether it has yet been validly redeemed by the input of another, onward transaction 152*j* according to the node protocol. Another condition for a transaction to be valid is that the output of the preceding transition 152*i* which it attempts to spend or redeem has not already been spent/redeemed by another valid transaction. Again if not valid, the transaction 152*j* will not be propagated or recorded in the blockchain. This guards against double-spending whereby the spender tries to spend the output of the same transaction more than once. An account-based model on the other hand guards against double-spending by maintaining an account balance. Because again there is a defined order of transactions, the account balance has a single defined state at any one time.

In addition to validation, at least some of the nodes 104M also race to be the first to create blocks of transactions in a process known as mining, which is underpinned by "proof of work". At a mining node 104M, new transactions are added to a pool of valid transactions that have not yet appeared in a block. The miners then race to assemble a new valid block 151 of transactions 152 from the pool of transactions 154 by attempting to solve a cryptographic puzzle. Typically this comprises searching for a "nonce" value such that when the nonce is concatenated with the pool of transactions 154 and hashed, then the output of the hash meets a predetermined condition. E.g. the predetermined condition may be that the output of the hash has a certain predefined number of leading zeros. A property of a hash function is that it has an unpredictable output with respect to its input. Therefore this search can only be performed by brute force, thus consuming a substantive amount of processing resource at each node 104M that is trying to solve the puzzle.

The first miner node 104M to solve the puzzle announces this to the network 106, providing the solution as proof which can then be easily checked by the other nodes 104 in the network (once given the solution to a hash it is straightforward to check that it causes the output of the hash to meet the condition). The pool of transactions 154 for which the winner solved the puzzle then becomes recorded as a new block 151 in the blockchain 150 by at least some of the nodes 104 acting as storage nodes 104S, based on having checked the winner's announced solution at each such node. A block pointer 155 is also assigned to the new block 151*n* pointing back to the previously created block 151*n*-1 in the chain. The proof-of-work helps reduce the risk of double spending since it takes a large amount of effort to create a new block 151, and as any block containing a double spend is likely to be rejected by other nodes 104, mining nodes 104M are incentivised not to allow double spends to be included in their blocks. Once created, the block 151 cannot be modified since it is recognized and maintained at each of the storing nodes 104S in the P2P network 106 according to the same protocol. The block pointer 155 also imposes a sequential order to the blocks 151. Since the transactions 152 are recorded in the ordered blocks at each storage node 104S in a P2P network 106, this therefore provides an immutable public ledger of the transactions.

Note that different miners 104M racing to solve the puzzle at any given time may be doing so based on different snapshots of the unmined transaction pool 154 at any given time, depending on when they started searching for a solution. Whoever solves their respective puzzle first defines which transactions 152 are included in the next new block 151*n*, and the current pool 154 of unmined transactions is updated. The miners 104M then continue to race to create a block from the newly defined outstanding pool 154, and so forth. A protocol also exists for resolving any "fork" that may arise, which is where two miners 104M solve their puzzle within a very short time of one another such that a conflicting view of the blockchain gets propagated. In short, whichever prong of the fork grows the longest becomes the definitive blockchain 150.

In most blockchains the winning miner 104M is automatically rewarded with a special kind of new transaction which creates a new quantity of the digital asset out of nowhere (as opposed to normal transactions which transfer an amount of the digital asset from one user to another). Hence the winning node is said to have "mined" a quantity of the digital asset. This special type of transaction is sometime referred to as a "generation" transaction. It automatically forms part of the new block 151*n*. This reward gives an incentive for the miners 104M to participate in the proof-of-work race. Often a regular (non-generation) transaction 152 will also specify an additional transaction fee in one of its outputs, to further reward the winning miner 104M that created the block 151*n* in which that transaction was included.

Due to the computational resource involved in mining, typically at least each of the miner nodes 104M takes the form of a server comprising one or more physical server units, or even whole a data centre. Each forwarding node 104M and/or storage node 104S may also take the form of a server or data centre. However in principle any given node 104 could take the form of a user terminal or a group of user terminals networked together.

The memory of each node 104 stores software configured to run on the processing apparatus of the node 104 in order to perform its respective role or roles and handle transactions 152 in accordance with the node protocol. It will be understood that any action attributed herein to a node 104 may be performed by the software run on the processing apparatus of the respective computer equipment. Also, the term "blockchain" as used herein is a generic term that refers to the kind of technology in general, and does not limit to any particular proprietary blockchain, protocol or service.

Also connected to the network 101 is the computer equipment 102 of each of a plurality of parties 103 in the role of consuming users. These act as payers and payees in transactions but do not necessarily participate in mining or propagating transactions on behalf of other parties. They do not necessarily run the mining protocol. Two parties 103 and their respective equipment 102 are shown for illustrative purposes: a first party 103*a* and his/her respective computer equipment 102*a*, and a second party 103*b* and his/her respective computer equipment 102*b*. It will be understood that many more such parties 103 and their respective computer equipment 102 may be present and participating in the system, but for convenience they are not illustrated. Each party 103 may be an individual or an organization. Purely by way of illustration the first party 103*a* is referred to herein as Alice and the second party 103*b* is referred to as Bob, but it will be appreciated that this is not limiting and any reference herein to Alice or Bob may be replaced with "first party" and "second party" respectively.

The computer equipment 102 of each party 103 comprises respective processing apparatus comprising one or more processors, e.g. one or more CPUs, GPUs, other accelerator processors, application specific processors, and/or FPGAs. The computer equipment 102 of each party 103 further comprises memory, i.e. computer-readable storage in the form of a non-transitory computer-readable medium or media. This memory may comprise one or more memory units employing one or more memory media, e.g. a magnetic medium such as hard disk; an electronic medium such as an SSD, flash memory or EEPROM; and/or an optical medium such as an optical disc drive. The memory on the computer equipment 102 of each party 103 stores software comprising a respective instance of at least one client application 105 arranged to run on the processing apparatus. It will be understood that any action attributed herein to a given party 103 may be performed using the software run on the processing apparatus of the respective computer equipment 102. The computer equipment 102 of each party 103 comprises at least one user terminal, e.g. a desktop or laptop computer, a tablet, a smartphone, or a wearable device such as a smartwatch. The computer equipment 102 of a given party 103 may also comprise one or more other networked resources, such as cloud computing resources accessed via the user terminal.

The client application or software 105 may be initially provided to the computer equipment 102 of any given party 103 on suitable computer-readable storage medium or media, e.g. downloaded from a server, or provided on a removable storage device such as a removable SSD, flash memory key, removable EEPROM, removable magnetic disk drive, magnetic floppy disk or tape, optical disk such as a CD or DVD ROM, or a removable optical drive, etc.

The client application 105 comprises at least a "wallet" function. This has two main functionalities. One of these is to enable the respective user party 103 to create, sign and send transactions 152 to be propagated throughout the network of nodes 104 and thereby included in the blockchain 150. The other is to report back to the respective party the amount of the digital asset that he or she currently owns. In an output-based system, this second functionality comprises collating the amounts defined in the outputs of the various 152 transactions scattered throughout the blockchain 150 that belong to the party in question.

The instance of the client application 105 on each computer equipment 102 is operatively coupled to at least one of the forwarding nodes 104F of the P2P network 106. This enables the wallet function of the client 105 to send transactions 152 to the network 106. The client 105 is also able to contact one, some or all of the storage nodes 104 in order to query the blockchain 150 for any transactions of which the respective party 103 is the recipient (or indeed inspect other parties' transactions in the blockchain 150, since in embodiments the blockchain 150 is a public facility which provides trust in transactions in part through its public visibility). The wallet function on each computer equipment 102 is configured to formulate and send transactions 152 according to a transaction protocol. Each node 104 runs software configured to validate transactions 152 according to a node protocol, and in the case of the forwarding nodes 104F to forward transactions 152 in order to propagate them throughout the network 106. The transaction protocol and node protocol correspond to one another, and a given transaction protocol goes with a given node protocol, together implementing a given transaction model. The same transaction protocol is used for all transactions 152 in the blockchain 150 (though the transaction protocol may allow different subtypes of transaction within it). The same node protocol is used by all the nodes 104 in the network 106 (though it many handle different subtypes of transaction differently in accordance with the rules defined for that subtype, and also different nodes may take on different roles and hence implement different corresponding aspects of the protocol).

As mentioned, the blockchain 150 comprises a chain of blocks 151, wherein each block 151 comprises a set of one or more transactions 152 that have been created by a proof-of-work process as discussed previously. Each block 151 also comprises a block pointer 155 pointing back to the previously created block 151 in the chain so as to define a sequential order to the blocks 151. The blockchain 150 also comprises a pool of valid transactions 154 waiting to be included in a new block by the proof-of-work process. Each transaction 152 comprises a pointer back to a previous transaction so as to define an order to sequences of transactions (N.B. sequences of transactions 152 are allowed to branch). The chain of blocks 151 goes all the way back to a genesis block (Gb) 153 which was the first block in the chain. One or more original transactions 152 early on in the chain 150 pointed to the genesis block 153 rather than a preceding transaction.

When a given party 103, say Alice, wishes to send a new transaction 152*j* to be included in the blockchain 150, then she formulates the new transaction in accordance with the relevant transaction protocol (using the wallet function in her client application 105). She then sends the transaction 152 from the client application 105 to one of the one or more forwarding nodes 104F to which she is connected. E.g. this could be the forwarding node 104F that is nearest or best connected to Alice's computer 102. When any given node 104 receives a new transaction 152*j*, it handles it in accordance with the node protocol and its respective role. This comprises first checking whether the newly received transaction 152*j* meets a certain condition for being "valid", examples of which will be discussed in more detail shortly. In some transaction protocols, the condition for validation may be configurable on a per-transaction basis by scripts included in the transactions 152. Alternatively the condition could simply be a built-in feature of the node protocol, or be defined by a combination of the script and the node protocol.

On condition that the newly received transaction 152*j* passes the test for being deemed valid (i.e. on condition that it is "validated"), any storage node 104S that receives the transaction 152*j* will add the new validated transaction 152 to the pool 154 in the copy of the blockchain 150 maintained at that node 104S. Further, any forwarding node 104F that receives the transaction 152*j* will propagate the validated transaction 152 onward to one or more other nodes 104 in the P2P network 106. Since each forwarding node 104F applies the same protocol, then assuming the transaction 152*j* is valid, this means it will soon be propagated throughout the whole P2P network 106.

Once admitted to the pool 154 in the copy of the blockchain 150 maintained at one or more storage nodes 104, then miner nodes 104M will start competing to solve the proof-of-work puzzle on the latest version of the pool 154 including the new transaction 152 (other miners 104M may still be trying to solve the puzzle based on the old view of the pool 154, but whoever gets there first will define where the next new block 151 ends and the new pool 154 starts, and eventually someone will solve the puzzle for a part of the pool 154 which includes Alice's transaction 152*j*). Once the proof-of-work has been done for the pool 154 including the new transaction 152*j*, it immutably becomes part of one of the blocks 151 in the blockchain 150. Each transaction 152 comprises a pointer back to an earlier transaction, so the order of the transactions is also immutably recorded.

Figure 2:
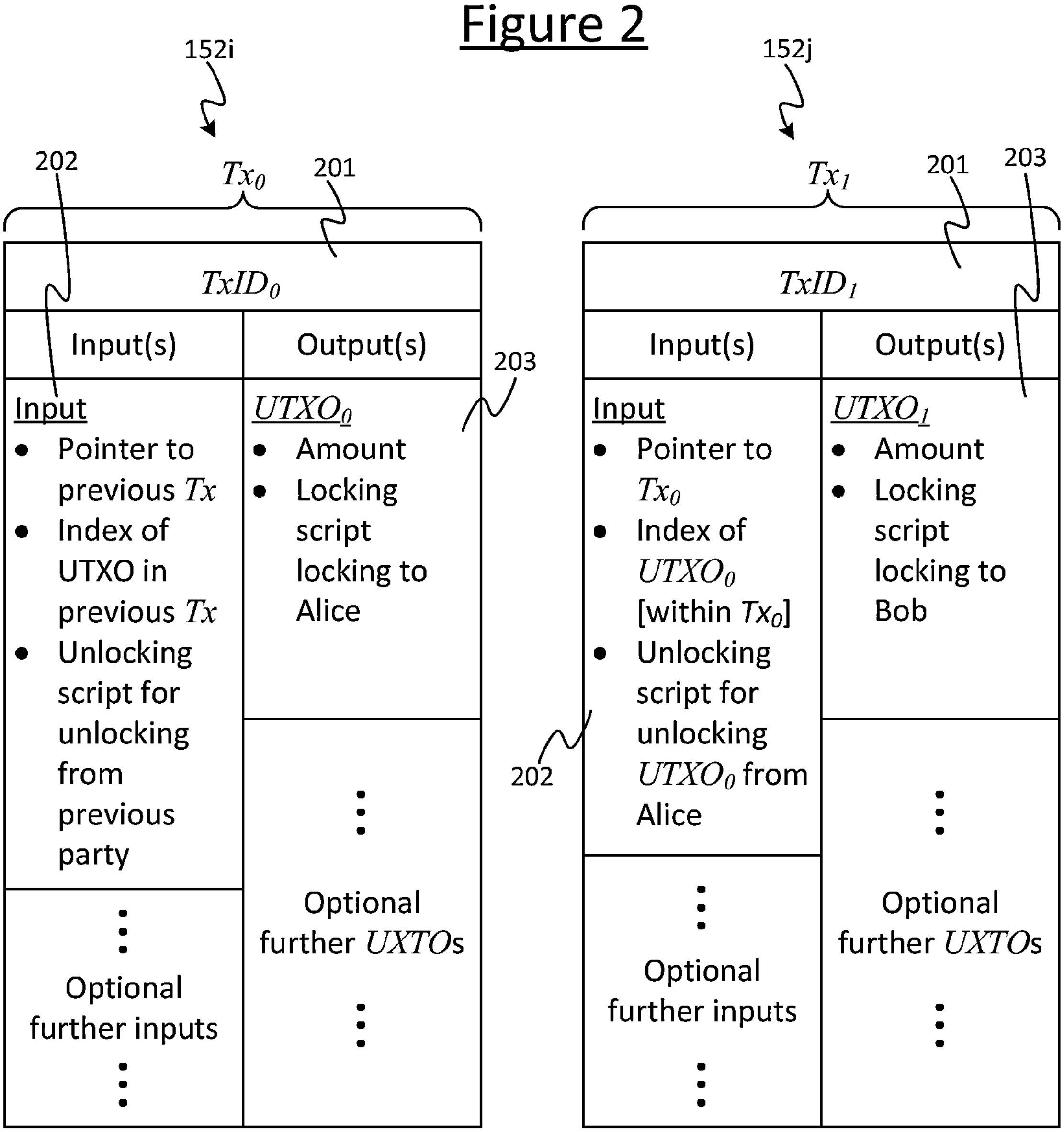
FIG. 2 schematically illustrates some examples of transactions which may be recorded in a blockchain.

FIG. 2 illustrates an example transaction protocol. This is an example of an UTXO-based protocol. A transaction 152 (abbreviated "Tx") is the fundamental data structure of the blockchain 150 (each block 151 comprising one or more transactions 152). The following will be described by reference to an output-based or "UTXO" based protocol. However, this not limiting to all possible embodiments.

In a UTXO-based model, each transaction ("Tx") 152 comprises a data structure comprising one or more inputs 202, and one or more outputs 203. Each output 203 may comprise an unspent transaction output (UTXO), which can be used as the source for the input 202 of another new transaction (if the UTXO has not already been redeemed). The UTXO specifies an amount of a digital asset (a store of value). It may also contain the transaction ID of the transaction from which it came, amongst other information. The transaction data structure may also comprise a header 201, which may comprise an indicator of the size of the input field(s) 202 and output field(s) 203. The header 201 may also include an ID of the transaction. In embodiments the transaction ID is the hash of the transaction data (excluding the transaction ID itself) and stored in the header 201 of the raw transaction 152 submitted to the miners 104M.

Say Alice 103*a* wishes to create a transaction 152*j* transferring an amount of the digital asset in question to Bob 103*b*. In FIG. 2 Alice's new transaction 152*j* is labelled "$Tx_1$". It takes an amount of the digital asset that is locked to Alice in the output 203 of a preceding transaction 152*i* in the sequence, and transfers at least some of this to Bob. The preceding transaction 152*i* is labelled "$Tx_0$" in FIG. 2. $Tx_0$ and $Tx_1$ are just an arbitrary labels. They do not necessarily mean that $Tx_0$ is the first transaction in the blockchain 151, nor that $Tx_1$ is the immediate next transaction in the pool 154. $Tx_1$ could point back to any preceding (i.e. antecedent) transaction that still has an unspent output 203 locked to Alice.

The preceding transaction $Tx_0$ may already have been validated and included in the blockchain 150 at the time when Alice creates her new transaction $Tx_1$, or at least by the time she sends it to the network 106. It may already have been included in one of the blocks 151 at that time, or it may be still waiting in the pool 154 in which case it will soon be included in a new block 151. Alternatively $Tx_0$ and $Tx_1$ could be created and sent to the network 102 together, or $Tx_0$ could even be sent after $Tx_1$ if the node protocol allows for buffering "orphan" transactions. The terms "preceding" and "subsequent" as used herein in the context of the sequence of transactions refer to the order of the transactions in the sequence as defined by the transaction pointers specified in the transactions (which transaction points back to which other transaction, and so forth). They could equally be replaced with "predecessor" and "successor", or "antecedent" and "descendant", "parent" and "child", or such like. It does not necessarily imply an order in which they are created, sent to the network 106, or arrive at any given node 104. Nevertheless, a subsequent transaction (the descendent transaction or "child") which points to a preceding transaction (the antecedent transaction or "parent") will not be validated until and unless the parent transaction is validated. A child that arrives at a node 104 before its parent is considered an orphan. It may be discarded or buffered for a certain time to wait for the parent, depending on the node protocol and/or miner behaviour.

One of the one or more outputs 203 of the preceding transaction $Tx_0$ comprises a particular UTXO, labelled here $UTXO_0$. Each UTXO comprises a value specifying an amount of the digital asset represented by the UTXO, and a locking script which defines a condition which must be met by an unlocking script in the input 202 of a subsequent transaction in order for the subsequent transaction to be validated, and therefore for the UTXO to be successfully redeemed. Typically the locking script locks the amount to a particular party (the beneficiary of the transaction in which it is included). I.e. the locking script defines an unlocking condition, typically comprising a condition that the unlocking script in the input of the subsequent transaction comprises the cryptographic signature of the party to whom the preceding transaction is locked.

The locking script (aka scriptPubKey) is a piece of code written in the domain specific language recognized by the node protocol. A particular example of such a language is called "Script" (capital S). The locking script specifies what information is required to spend a transaction output 203, for example the requirement of Alice's signature. Unlocking scripts appear in the outputs of transactions. The unlocking script (aka scriptSig) is a piece of code written the domain specific language that provides the information required to satisfy the locking script criteria. For example, it may contain Bob's signature. Unlocking scripts appear in the input 202 of transactions.

So in the example illustrated, $UTXO_0$ in the output 203 of $Tx_0$ comprises a locking script [Checksig $P_A$] which requires a signature Sig $P_A$ of Alice in order for $UTXO_0$ to be redeemed (strictly, in order for a subsequent transaction attempting to redeem $UTXO_0$ to be valid). [Checksig $P_A$] contains the public key $P_A$ from a public-private key pair of Alice. The input 202 of $Tx_1$ comprises a pointer pointing back to $Tx_1$ (e.g. by means of its transaction ID, $TxID_0$, which in embodiments is the hash of the whole transaction $Tx_0$). The input 202 of $Tx_1$ comprises an index identifying $UTXO_0$ within $Tx_0$, to identify it amongst any other possible outputs of $Tx_0$. The input 202 of $Tx_1$ further comprises an unlocking script <Sig $P_A$> which comprises a cryptographic signature of Alice, created by Alice applying her private key from the key pair to a predefined portion of data (sometimes called the "message" in cryptography). What data (or "message") needs to be signed by Alice to provide a valid signature may be defined by the locking script, or by the node protocol, or by a combination of these.

When the new transaction $Tx_1$ arrives at a node 104, the node applies the node protocol. This comprises running the locking script and unlocking script together to check whether the unlocking script meets the condition defined in the locking script (where this condition may comprise one or more criteria). In embodiments this involves concatenating the two scripts:

<Sig $P_A$><$P_A$>||[Checksig $P_A$]

where "||" represents a concatenation and "< . . . >" means place the data on the stack, and "[ . . . ]" is a function comprised by the unlocking script (in this example a stack-based language). Equivalently the scripts may be run one after another, with a common stack, rather than concatenating the scripts. Either way, when run together, the scripts use the public key $P_A$ of Alice, as included in the locking script in the output of $Tx_0$, to authenticate that the locking script in the input of $Tx_1$ contains the signature of Alice signing the expected portion of data. The expected portion of data itself (the "message") also needs to be included in $Tx_0$ order to perform this authentication. In embodiments the signed data comprises the whole of $Tx_0$ (so a separate element does to need to be included specifying the signed portion of data in the clear, as it is already inherently present).

The details of authentication by public-private cryptography will be familiar to a person skilled in the art. Basically, if Alice has signed a message by encrypting it with her private key, then given Alice's public key and the message in the clear (the unencrypted message), another entity such as a node 104 is able to authenticate that the encrypted version of the message must have been signed by Alice. Signing typically comprises hashing the message, signing the hash, and tagging this onto the clear version of the message as a signature, thus enabling any holder of the public key to authenticate the signature.

If the unlocking script in $Tx_1$ meets the one or more conditions specified in the locking script of $Tx_0$ (so in the example shown, if Alice's signature is provided in $Tx_1$ and authenticated), then the node 104 deems $Tx_1$ valid. If it is a storage node 104S, this means it will add it to the pool of transactions 154 awaiting proof-of-work. If it is a forwarding node 104F, it will forward the transaction $Tx_1$ to one or more other nodes 104 in the network 106, so that it will be propagated throughout the network. Once $Tx_1$ has been validated and included in the blockchain 150, this defines $UTXO_0$ from $Tx_0$ as spent. Note that $Tx_1$ can only be valid if it spends an unspent transaction output 203. If it attempts to spend an output that has already been spent by another transaction 152, then $Tx_1$ will be invalid even if all the other conditions are met. Hence the node 104 also needs to check whether the referenced UTXO in the preceding transaction $Tx_0$ is already spent (has already formed a valid input to another valid transaction). This is one reason why it is important for the blockchain 150 to impose a defined order on the transactions 152. In practice a given node 104 may maintain a separate database marking which UTXOs 203 in which transactions 152 have been spent, but ultimately what defines whether a UTXO has been spent is whether it has already formed a valid input to another valid transaction in the blockchain 150.

Note that in UTXO-based transaction models, a given UTXO needs to be spent as a whole. It cannot "leave behind" a fraction of the amount defined in the UTXO as spent while another fraction is spent. However the amount from the UTXO can be split between multiple outputs of the next transaction. E.g. the amount defined in $UTXO_0$ in $Tx_0$ can be split between multiple UTXOs in $Tx_1$. Hence if Alice does not want to give Bob all of the amount defined in $UTXO_0$, she can use the remainder to give herself change in a second output of $Tx_1$, or pay another party.

In practice Alice will also usually need to include a fee for the winning miner, because nowadays the reward of the generation transaction alone is not typically sufficient to motivate mining. If Alice does not include a fee for the miner, $Tx_0$ will likely be rejected by the miner nodes 104M, and hence although technically valid, it will still not be propagated and included in the blockchain 150 (the miner protocol does not force miners 104M to accept transactions 152 if they don't want). In some protocols, the mining fee does not require its own separate output 203 (i.e. does not need a separate UTXO). Instead any different between the total amount pointed to by the input(s) 202 and the total amount of specified in the output(s) 203 of a given transaction 152 is automatically given to the winning miner 104. E.g. say a pointer to $UTXO_0$ is the only input to $Tx_1$, and $Tx_1$ has only one output $UTXO_1$. If the amount of the digital asset specified in $UTXO_0$ is greater than the amount specified in $UTXO_1$, then the difference automatically goes to the winning miner 104M. Alternatively or additionally however, it is not necessarily excluded that a miner fee could be specified explicitly in its own one of the UTXOs 203 of the transaction 152.

Note also that if the total amount specified in all the outputs 203 of a given transaction 152 is greater than the total amount pointed to by all its inputs 202, this is another basis for invalidity in most transaction models. Therefore such transactions will not be propagated nor mined into blocks 151.

Alice and Bob's digital assets consist of the unspent UTXOs locked to them in any transactions 152 anywhere in the blockchain 150. Hence typically, the assets of a given party 103 are scattered throughout the UTXOs of various transactions 152 throughout the blockchain 150. There is no one number stored anywhere in the blockchain 150 that defines the total balance of a given party 103. It is the role of the wallet function in the client application 105 to collate together the values of all the various UTXOs which are locked to the respective party and have not yet been spent in another onward transaction. It can do this by querying the copy of the blockchain 150 as stored at any of the storage nodes 104S, e.g. the storage node 104S that is closest or best connected to the respective party's computer equipment 102.

Note that the script code is often represented schematically (i.e. not the exact language). For example, one may write [Checksig $P_A$] to mean [Checksig $P_A$]=OP_DUP OP_HASH160 <Pa>OP_EQUALVERIFY OP_CHECKSIG. "OP_ . . . " refers to a particular opcode of the Script language. OP_CHECKSIG (also called "Checksig") is a Script opcode that takes two inputs (signature and public key) and verifies the signature's validity using the Elliptic Curve Digital Signature Algorithm (ECDSA). At runtime, any occurrences of signature ('sig') are removed from the script but additional requirements, such as a hash puzzle, remain in the transaction verified by the 'sig' input. As another example, OP_RETURN is an opcode of the Script language for creating an unspendable output of a transaction that can store metadata within the transaction, and thereby record the metadata immutably in the blockchain 150. E.g. the metadata could comprise a document which it is desired to store in the blockchain.

The signature $P_A$ is a digital signature. In embodiments this is based on the ECDSA using the elliptic curve secp256k1. A digital signature signs a particular piece of data. In embodiments, for a given transaction the signature will sign part of the transaction input, and all or part of the transaction output. The particular parts of the outputs it signs depends on the SIGHASH flag. The SIGHASH flag is a 4-byte code included at the end of a signature to select which outputs are signed (and thus fixed at the time of signing).

The locking script is sometimes called "scriptPubKey" referring to the fact that it comprises the public key of the party to whom the respective transaction is locked. The unlocking script is sometimes called "scriptSig" referring to the fact that it supplies the corresponding signature. However, more generally it is not essential in all applications of a blockchain 150 that the condition for a UTXO to be redeemed comprises authenticating a signature. More generally the scripting language could be used to define any one or more conditions. Hence the more general terms "locking script" and "unlocking script" may be preferred.

Figure 3:
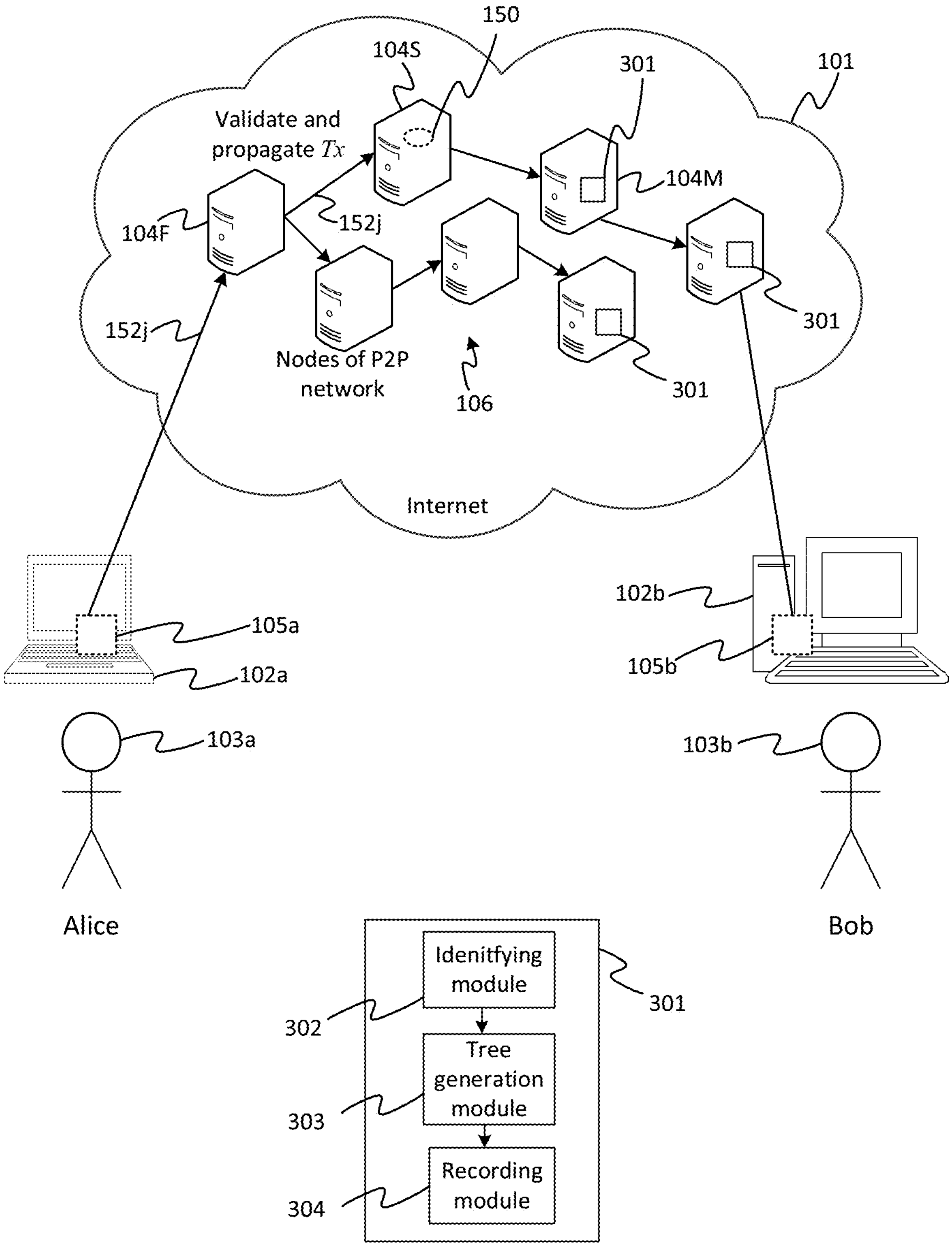
FIG. 3 is a schematic block diagram of another system for implementing a blockchain.

FIG. 3 shows a system 100 for implementing a blockchain 150. The system 100 is substantially the same as that described in relation to FIG. 1 except that additional functionality is involved. One or more nodes 104 of the network may comprise software 301 for generating a secondary transaction identifier of a target transaction 152 which is to be recorded in a block 151 of the blockchain 150. Preferably, one, some or all of the miners 104M may comprise said software (referred to as "miner software"), however it is not excluded that the computer equipment of one or more parties (e.g. Alice and/or Bob) may comprise said software.

FIG. 3 also shows a block diagram of the miner software which may comprise one or more modules. An identifying module 302 is configured to obtain the target transaction, e.g. the target transaction may be received from a forwarding node 104F of the network, and identify a set of data fields of the target transaction. Each data field in the set comprises data of the target transaction. For example, one or more data fields may comprise payment-related data. The set of data fields together form the full transaction. If the transaction comprises media content, one or more data fields may comprise part or all of that media content. A tree generation module 303 is configured to generate a hash tree using the set of data fields. The set of data fields are input to the algorithm to generate a hash tree (e.g. a Merkle tree). The hash tree comprises a root hash, which in the following discussion serves as a secondary transaction identifier of the target transaction. A recording module 304 is configured to record the secondary transaction identifier (the root hash) in a first transaction field (a generation transaction) of the block 152. The block is then recorded in the blockchain.

The secondary transaction identifier enables a querying user to check the existence of a data field (referred to as candidate data field herein) within the target transaction, without having to obtain or have access to the full transaction. For example, the client application 105 of a user (e.g. Bob) may not have sufficient capabilities to obtain the full transaction. For example, Bob may wish to initially check whether the target transaction comprises media content (e.g. a movie clip), without having to obtain the full transaction. As another example, a miner may wish to check the payment portions of the transaction without having to store other parts of the transaction. As a further example, a node (e.g. a miner or a storage node) may wish to prune a transaction. Here, pruning means replacing at least part of a transaction with a hash of the original data. However, the node may still need to prove to the querying user that the transaction contained a candidate data field (e.g. a spendable output of the transaction) which has now been "pruned" (i.e. replaced with a hash).

To check whether the target transaction contains the candidate data field, the querying user (e.g. Bob 103*b*) obtains the candidate data field (or a hash thereof), the secondary transaction identifier of the target transaction, and an authentication path (or hash path). The authentication path comprises a set of hashes taken from a hash tree. The querying user traverses a hash tree using a hash of the candidate data field and the hashes of the authentication path to obtain a candidate secondary transaction identifier. If the candidate secondary transaction identifier matches the obtained secondary transaction identifier, the transaction contains the candidate data field, and vice versa. In other words, the querying user can check whether the candidate data field forms part of the transaction represented by the secondary transaction identifier. Note that traversing the hash tree does not require the full transaction. Only the hash partners of both the hash of the candidate data field and the subsequently generated hash values are required. This process is described in more detail below with reference to FIG. 5.

Transactions

At a high level a transaction Tx is a message that may comprise inputs and outputs, which transfer the ownership of a digital asset from a first set of addresses to a second set of addresses (which may or may not comprise one or more of the addresses in the first set).

One particular blockchain protocol uses transactions having fields comprising, amongst others, one or more of the following: version, txin_count, txin, txout_count, txout and locktime. Other protocols may use transactions which comprise some or none of these fields. The techniques disclosed herein apply to any blockchain protocol—the fields discussed below being used by way of example only.

The version field is an integer (e.g. a 4 byte integer) that indicates the set of protocol rules followed by a creator of the transaction. The txin_count field is a positive integer (e.g. between 1-byte and 9-bytes) specifying the number of inputs in the transaction.

The txout_count field is a positive integer, between 1-byte and 9-bytes, specifying the number of outputs in the transaction. The txout field is an array of transaction outputs. Each output may comprise one or more of the following sub-fields: value—an integer (e.g. an 8-byte integer) that indicates the value of the output; scriptPubKeyLen—an integer length (in bytes) of the locking script, up to 10,000 bytes; scriptPubKey—a structure of the locking script, which can comprise many separate elements; and locktime—an integer (e.g. a 4-byte integer) indicating the earliest time after which a transaction may be included in a block.

It should be appreciated that in this example protocol, the only fields of a transaction that may contain data of a considerable size are the script fields, namely scriptSig and scriptPubKey. These two fields are therefore the most important to consider in addressing the issue of lightweight proof of existence computations for large data.

An example of a transaction comprising one input and one output is shown below, with the notations P and H(P) referring to a public key and its RIPEMD-160 hash respectively.

```
{
  "version": 1,
  "locktime": 0,
  "txin_count": 1,
  "vin": [
    {
      "txid_prev": "7957g8585g094508030923405gbb0500bgg04gss093",
      "vout": 0,
      "scriptSigLen": 4,
      "scriptSig": {
        "asm": "904389685hghg0304905jfjf0439058345jfjf03405 . . . ",
        "hex": "837ff7833624590890357399340 9hghf09023843904 . . . "
      },
      "sequence": 4294967295
    }
  ],
  "txout_count": 1,
  "vout": [
    {
      "value": 0.01500000,
      "scriptPubKey Len": 4,
      "scriptPubKey":{
        "asm": " OP_DUP OP_HASH160 <H(P)> OP_EQUALVERIFY
OP_CHECKSIG",
        "hex": "76a859uf781923hfghg9491hdjd9391djjg9042jfjf49393459",
        "reqSigs": 1,
        "type": "pubkeyhash",
        "addresses": [
          "1GdK9hPHb487FMjfuie485jfkHFHnR",
        ]
    }
  ]
}
```

The txin field is an array of transaction inputs. Each input comprises one or more of the following sub-fields: outpoint—a structure indicating the pair (TxID, n) for the UTXO being spent, comprising; txid_prev—a transaction identifier TxID (e.g. a 32-byte string) for the UTXO being spent; vout a a output index (e.g. a 4-byte integer) n for the UTXO being spent; scriptSigLen an integer length (in bytes) of the unlocking script, up to 10,000 bytes; scriptSig—a structure of the unlocking script, which may comprise many separate elements; and sequence—an integer (e.g. a 4-byte integer) indicating the current version of the transaction.

A querying user may wish to check the version of a transaction to see whether that transaction (or every transaction in a block) was made using the same version or protocol. A querying user may wish to check the txin_count to perform an analysis of the blockchain, e.g. for research purposes. A querying user (e.g. a miner) may only want to check the output(s) of a transaction to check that the output for validity (e.g. that a digital asset can be spent).

Transactions may be uniquely identified using a hash, or a double-hash, of the transaction data. For instance, a transaction may be identifiers by its SHA-256 double-hash.

The transaction identifier TxID may for example be written as a function of a given transaction Tx as $$TxID := H^2(Tx),$$

where H is a hash function (e.g. a SHA-256 cryptographic hash function). It should be noted that the collision-resistant property of such cryptographic hash functions means that the entire transaction message m=Tx is required to generate the correct TxID. In other words, if an alternative message Tx' is hashed then an alternative identifier TxID' will be generated, provided Tx'≠Tx.

Generation Transactions

The first transaction in a block differs from the structure described above for a general transaction because it is used to allow miners to reclaim the mining incentive. This is also known as a 'generation' transaction because new digital assets are generated each time a new block is mined. This is known as the block reward. The generation transaction also allows miners to claim the aggregate total transaction fees determined by the other transactions in the block. The generation transaction only differs from the general form in the txin-count and txin fields. The txin_count field comprises the integer '01' as the generation transaction comprises a single input. The txin field itself differs from a non-generation transaction in several of its subfields as follows. Since there is no UTXO being spent in this case, the sub fields of the outpoint are: txid_prev a null value (all zeroes, e.g. 32 bytes worth of zeros) indicating lack of a pervious outpoint; and vout—a value (e.g. 0xffffffff) indicating lack of a previous outpoint. The scriptSigLen field is an integer length (in bytes) of the unlocking script, up 100 bytes. Since there is no UTXO to 'unlock', the scriptSig field is formed of two fields: a height field—a block height (e.g. of 4 bytes) of the block containing this transaction; and a generation_script—arbitrary data up to a maximum of 96 bytes. The final field is a sequence field—an integer (e.g. of 4 bytes) indicating the current version of the transaction.

The generation_script field of a generation transaction can be used by a user (e.g. miners) to include arbitrary data in a transaction.

Blocks

A block is a data structure comprises a set of transactions and optionally additional fields related to how a block is appended (mined) to the blockchain. The fields of a block of a particular blockchain protocol may be summarised as block header, txn_count and txns. A block header is a structure comprising information about how and when a block was mined, and what it contains. This comprises one or more of the following six sub-fields: version—an integer (e.g. a 4-byte integer) indicating the set of protocol rules used for block validation; prev_block—a double hash (e.g. a 32-byte SHA-256) of the previous block header; a Merkle_root—a double hash (e.g. a 32-byte SHA-256) derived from the Merkle tree of transactions; timestamp—an integer (e.g. a 4-byte integer) encoding the Unix time at which a miner generated the header; nbits—an integer (e.g. a 4-byte integer) encoding the target difficulty required for the block to be mined; and nonce—an integer (e.g. a 4-byte integer) chosen to achieve a block header hash of the required difficulty. The txn_count field is an integer of variable size indicating the number of transactions in a block. The txns field is a structure comprising transaction data for the full list of transactions included in a block. The first transaction in this list is always the generation transaction, and the remaining follow the general transaction structure described above.

Merkle Trees

A Merkle tree, also known as a binary hash tree, is a particular form of a hash tree. Each node in the tree (illustrated by a circle) is given an index pair (i,j) and is represented as N(i,j). The indices i,j are numerical labels that are related to a specific position in the tree. A feature of the Merkle tree is that the construction of each of its nodes is governed by the following equations:

$$N(i,j) = \begin{cases} H(D_i) & i = j \\ H(N(i,k) \| N(k+1,j)) & i \neq j \end{cases},$$

where k=(i+j−1)/2 and H is a cryptographic hash function.

Figure 4:
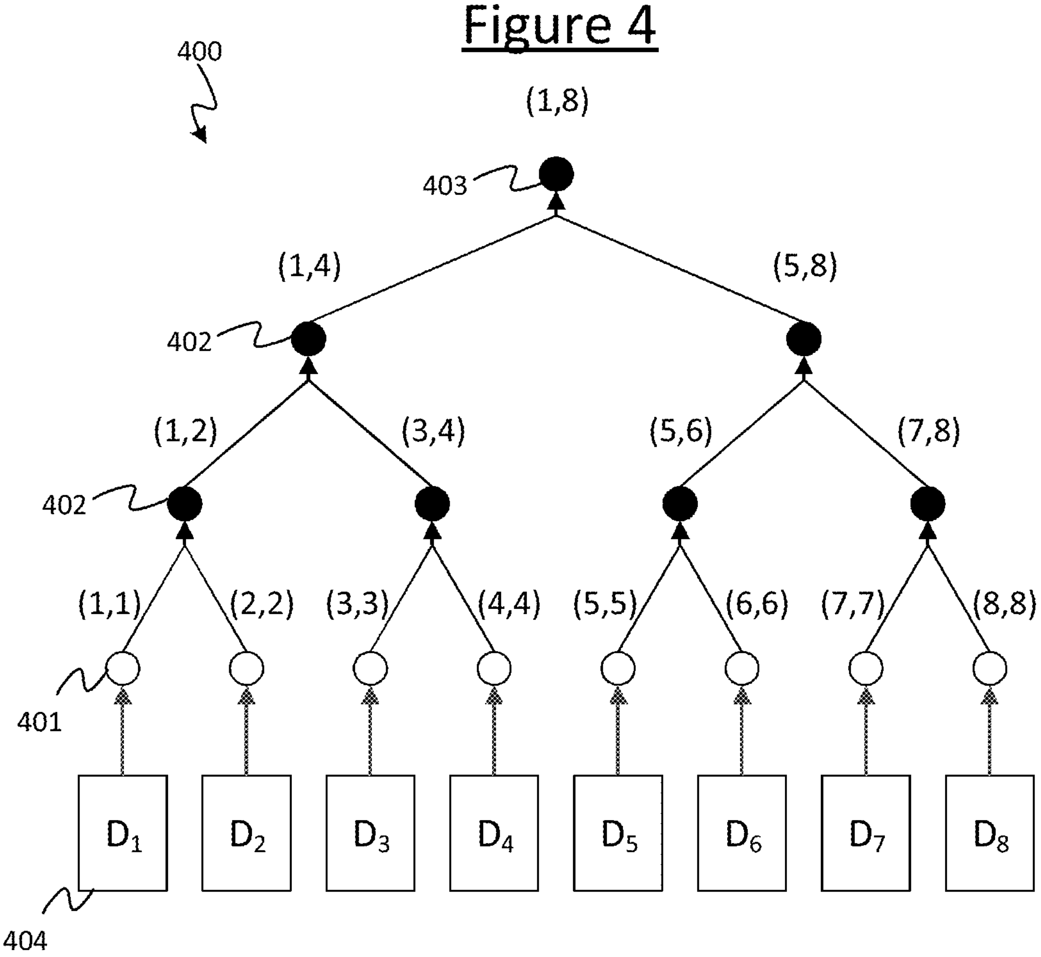
FIG. 4 is a schematic diagram of a Merkle tree.

A binary hash tree 400 constructed according to these equations is shown in FIG. 4. FIG. 4 shows that the i=j case corresponds to a leaf node 401, which is simply the hash of the corresponding $i^{th}$ block of data $D_i$. The i≠j case corresponds to an internal node 402 or root node 403, which is generated by recursively hashing and concatenating child nodes in the tree until the specific node or the root is reached. A leaf node of a hash tree is also referred to herein as a leaf hash. Similarly, internal nodes and root nodes also referred to as internal hashes or root hashes.

The construction of Merkle trees requires the use of cryptographic hash functions. In general, a hash function is considered cryptographically secure if it has the following properties:

1) Pre-image resistant—given h=H(m), it is computationally difficult to find m;
2) Second pre-image resistant—given h=H(m) and m, it is computationally difficult to find m' such that H(m')=h; and
3) Collision resistant—it is computationally difficult to find a pair of messages m and m' such that H(m)=H(m').

The primary transaction identifier TxID of a transaction is generated using such a hash function, and therefore the identifier inherits the properties of a hash function's digest. The root of a hash tree has very similar properties to a TxID in that the uniqueness of a hash tree root can be reduced to the uniqueness of the underlying cryptographic hash function. This is beneficial because as the root can be used as an identifier for data that is as unique as an identifier generated by hashing the data if the same hash function is used in both cases.

The primary function of a hash tree in most applications is to facilitate a proof that some data block $D_i$ 404 is a member of a list or set of N data blocks $\mathcal{D} \in \{D_1, \ldots, D_N\}$. Given a hash tree root and a candidate data block $D_i$, this can be treated as a 'proof-of-existence' of the block within the set. The mechanism for such a proof is known as a hash tree proof (or a Merkle proof for a Merkle tree) and comprises obtaining a set of hashes known as the hash or authentication path (or a Merkle path) for a given data block $D_i$ and root R. The authentication path for a data block is the minimum list of hashes required to reconstruct the root R by way of repeated hashing and concatenation. A proof-of-existence could be performed if all blocks $D_1, \ldots, D_N$ are known to the prover. This does however require a much larger storage overhead than the authentication path itself, as well as requiring that the entire data set is available to the prover.

The hash tree proves not just the existence of a data field $D_i$, but also that it is a member of a data set $\mathcal{D}$. Furthermore, when the transaction is on the blockchain, the hash tree proves that the data field $D_i$ is part of a transaction recorded on the blockchain.

Figure 5:
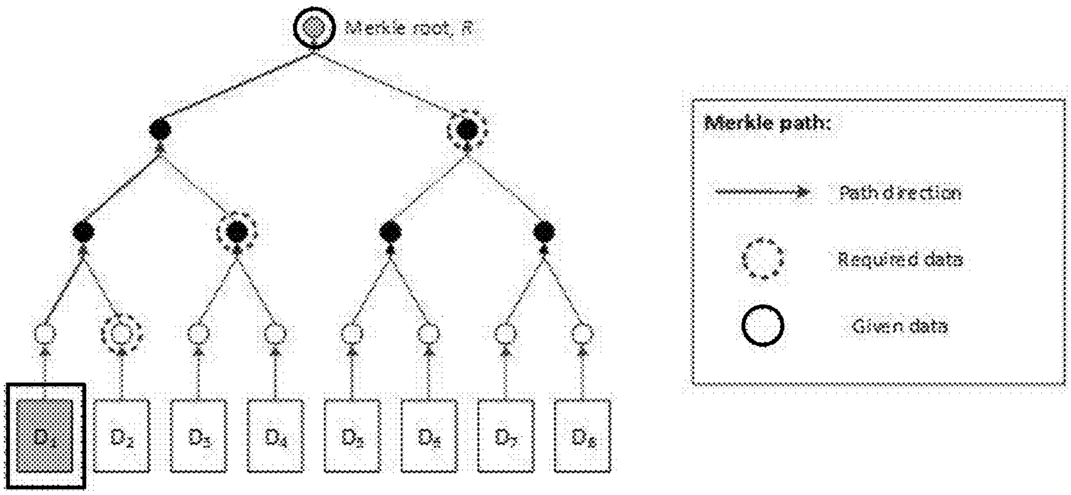
FIG. 5 illustrates a Merkle proof-of-existence of a data block $D_1$, in the tree represented by a root R, using a Merkle path.

FIG. 5 shows a Merkle proof-of-existence of a data block $D_1$, in a tree represented by a root R, using a Merkle path. Given a Merkle root R, it can be proved that the data block $D_1$ belongs to the set $\mathcal{D} \in \{D_1, \ldots, D_N\}$ represented by R by performing a Merkle proof as follows:

1) Obtain the Merkle root R from a trusted source.
2) Obtain the Merkle path Γ from a source. In this case, Γ is the set of hashes: $\Gamma = \{N(2,2), N(3,4), N(5,8)\}$.
3) Compute a Merkle proof using $D_1$ and Γ as follows:
   a. Hash (or double-hash, depending on implementation) the data block to obtain: $N(1,1)=H(D_1)$.
   b. Concatenate with N(2,2) and hash to obtain: $N(1,2)=H(N(1,1)\|N(2,2))$.
   c. Concatenate with N(3,4) and hash to obtain: $N(1,4)=H(N(1,2)\|N(3,4))$.
   d. Concatenate with N(5,8) and hash to obtain the root: $N(1,8)=H(N(1,4)\|N(5,8))$, $R'=N(1,8)$.
   e. Compare the calculated root R' with the root R obtained in (1):
      I. If R'=R, the existence of $D_1$ in the tree, and therefore the data set $\mathcal{D}$, is confirmed.
      II. If R'≠R, the proof has failed and $D_1$ is not confirmed to be a member of $\mathcal{D}$.

This demonstrates that performing the Merkle proof for a given block $D_1$ and root R is effectively traversing the Merkle tree 'upwards' by using only the minimum number of hash values necessary This is an efficient mechanism for providing a proof-of-existence for some data as part of the data set represented by a Merkle tree and its root. For example, if the data $D_1$ corresponds to a blockchain transaction and the root R is publicly available as part of a block header then it can be quickly proven that the transaction was included in that block.

Hereinafter the tuple (D, R, Γ) shall be used to represent a hash tree proof that the data packet D is part of the set $\mathcal{D}$ represented by the root R.

Transaction Tree Generation Algorithm

As mentioned above, the present disclosure provides a method for generating a secondary transaction identifier of a transaction for use in determining whether or not that transaction comprises a particular piece of data, referred to as a "candidate data field". The secondary transaction identifier is so-called since in most block chain protocols, each transaction is associated with a primary transaction identifier, usually generated by hashing (or double-hashing) the entire transaction.

The method comprises splitting a transaction field-wise into a set of data packets (or data fields) that can be used as the leaves of a hash tree, e.g. a Merkle tree, with the root of the hash tree corresponding to the secondary transaction identifier. Here, splitting is equivalent to identifying data fields of the transaction. In other words, the transaction does not actually have to be "divided". Instead, different parts of the transaction may be identified (e.g. assigned) as different ones of the set of data fields. The secondary transaction identifier will be unique to a given transaction (e.g. a unique 256-bit numeric representation (a hash value) of the given transaction). This hash value can be used to verify whether any individual field was a valid leaf of the hash tree without obtaining the entire set (i.e. the full transaction).

Given a transaction Tx, one way to verify that it has been mined into the blockchain is to verify that its corresponding TxID (primary transaction identifier) appears in a block. This check can done by performing a hash tree proof (e.g. a Merkle proof) to verify that the transaction corresponding to TxID is part of the transaction set represented by the hash root in the block header. However, this check requires the verifier to first obtain the full transaction message m=Tx and affirm that TxID=H(Tx) does in fact hold for the given Tx and the supposed TxID, where H is a hash function. This may be problematic for some users of the blockchain, in particular, when the user implements a lightweight client and/or the message m is large.

In examples a secondary transaction identifier MTxID may be generated that obeys the following definition: MTxID:=F(Tx, TxID). The algorithm F acts as a one-way function that generates a secondary transaction identifier from two input messages, Tx and TxID. Given the fact that a TxID can be written as a function of a transaction message Tx as TxID:=$H^2$(Tx), this means MTxID can be written as a function of a single message m=Tx in the following way: MTxID:=F(Tx, $H^2$(Tx)):=F(Tx). The algorithm F comprises a hash tree generator. The algorithm takes a full transaction as input Tx and returns a hash digest MTxID, which we can use as a secondary identifier for the transaction. The secondary identifier may be a 256-bit hash digest. It should be appreciated that the secondary identifier MTxID does not replace the primary identifier TxID in this scheme. To reinforce this, the design of the algorithm F includes the generation of TxID, e.g. using the typical double-hashing function $H^2$(Tx), which binds the secondary identifier to the primary identifier.

The method for generating a secondary transaction identifier MTxID can be split into three main stages, as summarised below.

| |
|---|
| Input: Tx |
| F (Tx): |
| 1) Calculate TxID: = $H^2$(Tx). |
| 2) Separate Tx into a set $\mathcal{D}$ of $N = 2^k$ ordered data packets, $\mathcal{D} := \{D_1, D_2, \ldots, D_N\}$. |
| 3) Generate a binary hash tree T using the packets of set $\mathcal{D}$ as the leaves and calculate its root R. |
| Output: MTxID = R |

In this example the hash tree is a binary hash tree (i.e. a Merkle tree). However in general any n-ary hash tree may be used, the n referring to the branching of the tree. For example, in a binary hash tree two child nodes are hashed to form a parent node, in a ternary hash tree three child nodes are hashed to form a parent node, and so on.

Stage 1: Calculation of TxID

The generating user may receive a transaction from one or more different parties (or nodes) of a blockchain network. For instance, the transaction may be transmitted by one node of the network directly to the generating user or via one or more different nodes. The generating user may be a miner who intends to record the transaction in a block of the blockchain.

The method may comprise generating a primary transaction identifier by hashing the transaction. The first stage is a SHA-256 double-hash calculation, performed on the Tx, which generates the primary transaction identifier TxID. Other hash functions may be used, and in some examples only a single hash calculation is performed. Usually the Tx message itself does not include the TxID explicitly. The subsequent stages of therefore require this explicit pre-calculation of TxID, such that the hash tree can be constructed in a way that encodes this primary identifier explicitly.

Stage 2: Separation of Tx into Ordered Data Set $\mathcal{D}$

The transaction data comprising the message Tx is separated into discrete packets that can be used as the leaves of a hash tree T. The transaction may be split into its existing fields. Most of these fields contain simple numeric data which will generally be very small in size—typically ranging between 1 and 32 bytes. Therefore the core concerns over increased overall transaction size will be related to the sigScript and scriptPubKey fields, which relate to inputs (unlocking) and outputs (locking) respectively. The fields of a transaction may be distinguished using three categories: input fields, output fields and other fields. In some examples, the transaction is split into these three categories, e.g. one data field comprising all input fields, one data field comprising all output fields, and one data field comprising the other fields. The input and output fields may be separated into non-script and script fields, the non-script field comprising numeric data and the script field comprising script data.

The following table shows ways in which a transaction may be split into a set of data fields.

| Field | Size (Bytes) | Input, Output or Other? | Script or Non-script? |
|---|---|---|---|
| version | 4 | other | |
| txin_count | 1-9 | other | |
| tx_in [ ] | | | |
| txid_prev | 32 | input | non-script |
| vout | 4 | input | non-script |
| scriptSigLen | variable | input | non-script |
| scriptSig | variable | input | script |
| sequence | 4 | input | non-script |
| txout_count | 1-9 | other | |
| txout [ ] | | | |
| value | 8 | output | non-script |
| scriptPubKeyLen | variable | output | non-script |
| scriptPubKey | variable | output | script |
| locktime | 4 | other | |

This table demonstrates that a Tx message can be split into its component fields to form a set of packets $\mathcal{D}$ in several ways.

In some examples, the transaction may be split into at least one data field comprising input data of the transaction (e.g. txid_prev); at least one data field comprising output data of the transaction (e.g. value); and at least one data field comprising non-input and non-output data (i.e. the other data, e.g. version) of the transaction. Each data field may consist of data of only one type, e.g. only input data.

In other examples, the transaction may be split into more data fields. For instance, the set of data fields may comprise: at least one data field comprising script input data of the transaction (e.g. scriptSig); at least one data field comprising non-script input data of the transaction (e.g. vout); at least one data field comprising script output data of the transaction of the transaction (e.g. scriptPubkey); and at least one data field comprising non-script output data of the transaction of the transaction (e.g. scriptPubKeyLen).

The transaction Tx may be split into the following set of ordered data packets:

$D_1$=<version>,

D2=<txin_count>, $D_3$=<txout_count>, $D_4$=<locktime>, $D_5$=<txid_prev>||<vout>||<scriptSigLen>||<sequence>, $D_6$=<scriptSig>, D7=<value>||<scriptPubKeyLen>, $D_8$=<scriptPubKey>.

The choice to split the data in this way has several benefits if each packet $D_i$ is a leaf of a binary hash tree. First, all non-script inputs are concatenated to form packet $D_5$ and similarly all non-script outputs are concatenated to form $D_7$. This means that every input and output of a transaction is split into exactly two parts—the non-script component and the script component. In a binary hash tree, this is particularly advantageous as it means every input and output can be paired as sibling leaves. The inputs and outputs may therefore be separated from other fields entirely, and the script and non-script components of each input or output may also be separated. This means that, in the case where a given script is very large, the non-script components can still be verified by performing a hash tree proof without having to handle the large script itself.

In addition to these fields, the TxID may also be included as a leaf in the hash tree T. Following on from the above example, this means include the data field $D_9$=<TxID>. In general, there may be many inputs and many outputs in a transaction, each of which may be split into two components by the algorithm F. The total number of data blocks $N=|\mathcal{D}|$ in this tree T will therefore be given by the equation $$N = \underbrace{4}_{\substack{Other\\fields}} + \underbrace{(2\times n_{in})}_{input\ fields} + \underbrace{(2\times n_{out})}_{output\ fields} + \underbrace{1}_{TxID},$$

where $n_{in}$, $n_{out}$ are the number of transaction inputs and outputs respectively. In some examples, all the other data fields may be concatenated to form a single data field. This reduces the total number of leaves to $N=2+2(n_{in}+n_{out})$.

In the case that there is no $k\in\mathbb{Z}^*$ such that $N=2^k$, $2^K-N>0$ data packets of null padding data may be added to ensure there are enough leaves of the binary hash tree. This padding could either be null data or it could be $2^k-N$ copies of the TxID so as to reinforce the link between the primary transaction identifier and the eventual secondary identifier MTxID.

A given transaction may comprise multiple inputs and/or multiple outputs. Each input may comprise script data and non-script data. Similarly, each output may comprise script data and non-script data. The transaction may be split such that one data field comprises all of the script data from each input and one data field comprises all of the non-script data from each input. The output data may be similarly divided. Alternatively, one or more data fields in combination may comprise all of the script data from each input and one or more data fields in combination may comprises all of the non-script data from each input. Again, the output data may be similarly divided.

In some cases, it may be desirable to extract portions of data from within a given field and use these as additional leaves of the hash tree T. Examples of data that might be extracted from a scriptSig field are signatures <Sig(P,m)>, and examples of data that may be extracted from a scriptPubKey field are public key hashes <H(P)>. In examples, either or both of these may be extracted to form a separate data field. Extracting these data elements from scripts and including them as additional data packets in the hash tree would allow lightweight verification of the participants in a transaction and their signatures without needing to handle other data.

As another example, an identifier of the transaction type may be included as a leaf in the hash tree. In a similar sense to a TxID this is not a field or data element included in a transaction message, but it can be identified by interpreting the message based on the criteria of standard transaction types, e.g. pay-to-public key hash (P2PKH), pay-to-script hash (P2SH), or non-standard. Including a data element signifying the transaction type would allow a lightweight user to identify important information about a transaction without having to retrieve or analyse it locally.

In some scenarios it is miners who will generate the secondary transaction identifier, e.g. at the point of mining the transaction into the blockchain. It may be desirable to split the transaction in a way which is simplest to implement for miners. A good candidate would be to generate the hash tree by fixing the number of leaves (e.g. $N=2^k$) for each tree and splitting the transaction message into N data packets such that $m=m_1\|m_2\|\ldots\|m_N$, where the common packet size scales linearly with the total transaction size.

Alternatively, a common packet size S for data leaves of the hash tree may be fixed. The transaction may then be split into as many packets N as are required. This option can be used to ensure that the low-bandwidth lightweight verification utility is not compromised by choosing a suitably small S.

The method comprises splitting the transaction into an ordered set of data fields, each data field comprising respective data of the transaction. The transaction message Tx may be separated into N discrete data packets comprising an ordered set of data leaves $\mathcal{D}:=\{D_1, D_2, \ldots, D_N\}$. This can be done in a number of ways, as detailed above.

Stage 3: Generation of the Hash Tree T Using $\mathcal{D}$ and Calculation of Root R The method comprises using the set of data fields as leaves of a transaction hash tree. The transaction hash tree comprises a leaf layer, one or more internal layers and a root layer. The leaf layer comprises a plurality of leaf nodes (also referred to as leaf hashes as each node is a hash digest). Each leaf node is generated by hashing a respective data field of the transaction. At least one of the leaf hashes is based on the primary transaction identifier. In some examples, one or more leaf hashes are generated by hashing the primary transaction identifier. In some examples, one or more data fields of the transaction are concatenated with the primary transaction identifier and then hashed to generate respective leaf hashes. Each internal layer comprises a plurality of internal nodes (or internal hashes). Each internal hash in a given internal layer is generated by hashing a concatenation of at least two hashes from a lower layer. E.g. the first or lowermost internal layer (i.e. the internal layer connected directly to the leaf layer) comprises internal nodes generated by hashing a concatenation of at least two leaf hashes. For a binary hash tree, two nodes from a given layer are concatenated and then hashed to generate a node of the next layer. For an n-ary hash tree, n nodes from a given layer are concatenated and then hashed to generate a node of the next layer. The root layer comprises a root of the transaction tree, i.e. the secondary transaction identifier. The secondary transaction identifier is generated by hashing a concatenation of the internal hashes of an uppermost internal layer of the one or more internal layers (i.e. the internal layer connected directly to the root layer).

The secondary transaction identifier (the root of the transaction hash tree) may be included in the generation transaction of the block. The block may then be recorded in the blockchain. Alternatively, as described below, a secondary transaction identifier may be included in a transaction that is transmitted to a miner via one or more nodes of the network.

Figure 6:
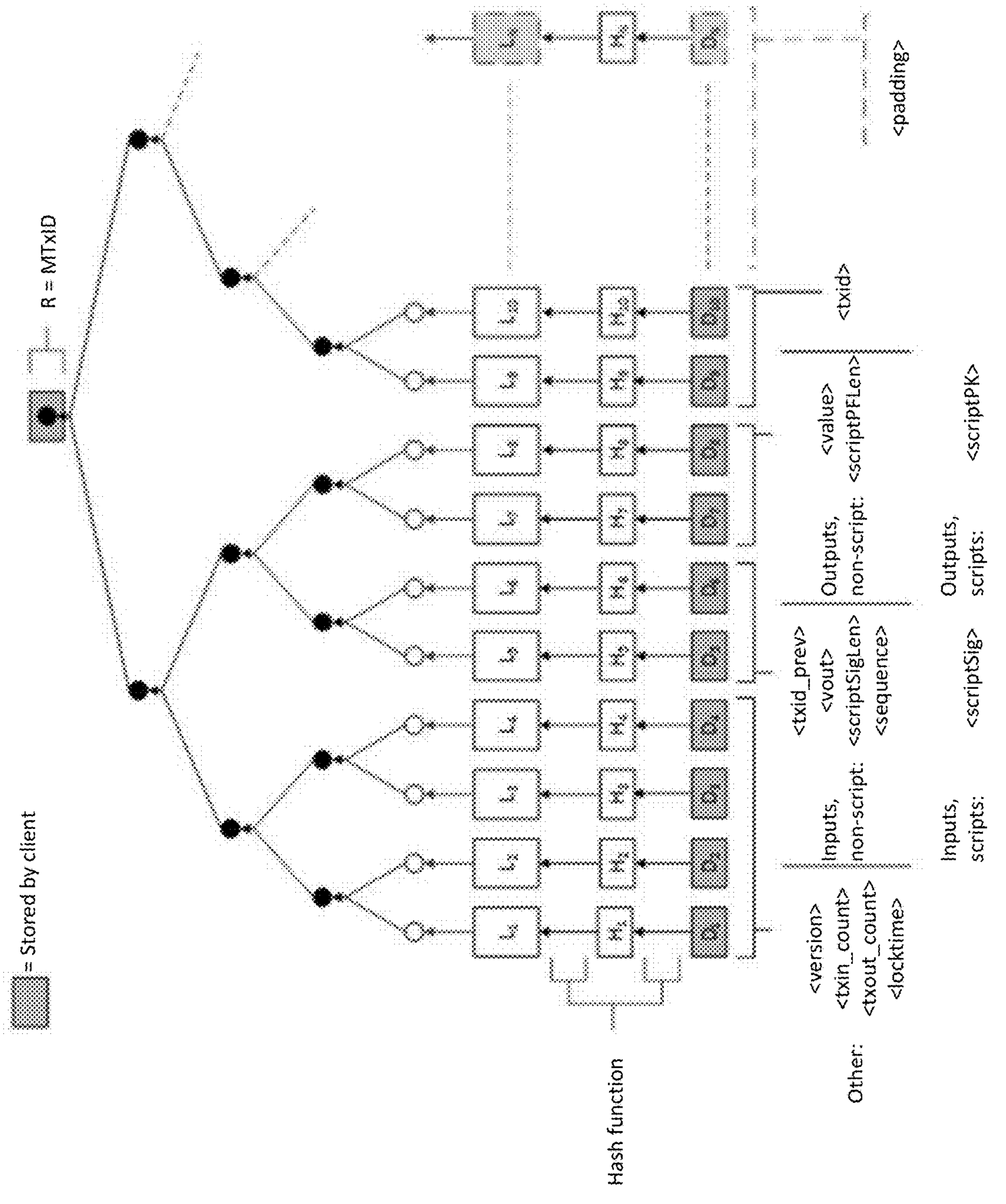
FIG. 6 is a schematic diagram of a transaction Merkle tree.

The algorithm F takes the ordered set of data packets $\mathcal{D}$ and constructs a hash tree T by using these packets as the leaves. FIG. 6 shows an example construction of a binary hash tree. In this example the first four data fields $D_1, \ldots, D_4$ are the other fields of a transaction, the next $2\times(n_{in}+n_{out})$ data fields are the input and output fields represented as pairs of script $D_5$, $D_6$ and non-script $D_7$, $D_8$ field data. The remaining data fields include at least one field $D_9$, $D_{10}$ containing TxID and any padding $D_N$ required to reach $N=2^k$ for some integer k.

Given these N data fields as leaves, the hash tree generation algorithm creates a Merkle tree T. The Merkle tree may be constructed using the same algorithm used to generate the primary transaction identifier. This means that T is constructed in the same way as a transaction tree $T_B$ whose root $R_B$ (the primary transaction identifier) is found in a block header, which includes the use of the hash function for leaves and the hash function for internal nodes. Construction of the transaction tree $T_B$ will be described in detail below. Note that, in both the hash tree T and the existing $T_B$, data fields may be double-hashed to generate the leaves of the tree. This is beneficial for lightweight proof-of-existence. Alternatively, data fields may be single-hashed to generate the leaves of the tree. One difference here is that that the leaves of T are the packets $\mathcal{D}\in\{D_1, \ldots, D_N\}$ comprising the fields of a single transaction, whereas the leaves of $T_B$ are the individual transactions that are included in a given block. Preferably the order of the leaves in the hash tree is exactly the same as the order of the packets as specified in stage 3.

A node (e.g. miner software run at the node) may parse the transaction message Tx into the ordered set of leaves and simply store them, along with the root R rather than storing the entire tree of hashes. Alternatively, the entire tree of hashes may also be stored. By only keeping the ordered leaves and the root the storage overhead is only increased by 32 bytes for R when compared with storing Tx, and the tree can be reconstructed at any time from this information. This small storage overhead can also be mitigated if a node chooses to store the data packets, as usual, and simply constructs the tree and its root from the packets as and when required.

If the secondary transaction identifier is generated by a miner, the miner may include it in a generation transaction of a block. If the secondary transaction identifier is generated by a user other than a miner, e.g. Alice, that user may include it within a transaction that is propagated through the network to be mined into a block by a miner. As another example, the secondary transaction identifier may be generated by a user that is not connected to the blockchain network but who has access to the target transaction. That user may transmit the secondary transaction identifier to one or more parties (which may or may not be connected to the blockchain network) over e.g. the internet. The secondary transaction identifier (the root of the transaction hash tree) may be recorded in (i.e. written to committed to) the generation transaction of a block (either the same block which contains the target transaction or a different block). The block may then be recorded in the blockchain. The secondary transaction identifier may be committed to a transaction other than generation transaction. For instance, a user may obtain the secondary transaction identifier, include it within a transaction (e.g. a script of the transaction), and transmit that transaction to one or more nodes of the network to be mined into the blockchain. The user who generates the secondary transaction identifier may additionally or alternatively store the identifier in local memory.

Candidate Data Field Verification

As mentioned, the secondary transaction identifier allows a querying user to check whether a transaction comprises a candidate data field. The querying user requires the candidate data field (or a hash thereof), the secondary transaction identifier and a hash tree path (or authentication path) in order to perform such a check. The generating user may transmit one or more of these requirement elements to the querying user. Alternatively, the querying user may obtain one or more elements from another user, or from the blockchain itself (e.g. the secondary transaction identifier may be obtained from the generation transaction).

In some examples the generating user may want to prove to the querying user that a transaction comprises a candidate data field without revealing the entire transaction (or alternatively the querying user may only want to check whether the transaction comprises the candidate data field). In that case the generating user may transmit only the candidate data field to the querying user.

A hash tree path comprises an ordered set of hashes. The set of hashes comprises at least a leaf hash. The set may further comprise one or more internal hashes. The number of internal hashes depends on both the number of data fields into which a transaction is split and the type of hash tree (e.g. whether the hash tree is a binary hash tree, a ternary hash tree, etc.)

The querying user uses the candidate data field (or a hash thereof) and the hash path to determine (by performing a hash tree proof) whether the root of a hash tree generated using those elements matches the secondary transaction identifier of the transaction. If the root matches the secondary transaction identifier, due to the uniqueness of the underlying hash function, the querying user can be confident that the transaction comprises the candidate data field.

The hash tree proof comprises concatenating a hash of the candidate data field with the at least one leaf hash in the ordered set of hashes (the hash tree path). This generates an internal hash (or internal node of the hash tree). The generated internal hash is then concatenated with one or more hashes in the hash tree path (a single hash if the hash tree is a binary hash tree). The concatenated internal hashes are then hashed to generate the next hash. Depending on the size of the hash tree (e.g. the number of data fields), the next hash may be another internal hash or the root hash. If the next hash is another internal hash, the process of concatenating with one or more internal hashes from the hash tree path and hashing the result is followed until the root hash is generated. Note that each hash in the hash tree path is only used once.

The root hash is equivalent to a candidate secondary transaction identifier. If the candidate secondary transaction identifier matches the obtained secondary transaction identifier, the candidate data field forms part of the transaction. An indication (e.g. TRUE or FALSE) may be output (e.g. to a user via a user device) to indicate whether the candidate data field forms part of the transaction. The output may be a visual or audio alert.

In some examples, the transaction comprises content data (e.g. media data). One or more data fields may comprise content data. The content data may be, for instance, image data (e.g. a picture), sound data (e.g. a song), video data (e.g. a film), or document data (e.g. a word document or pdf). The candidate data field may be a data field comprising data. This may therefore allow a party to verify whether a transaction comprises said content.

In some examples, the generating user which provides the secondary transaction identifier and the candidate data field may be a trusted node of the network.

Note that a "user" herein does not limit to an end-user or consumer. For instance in embodiments the generating user (recording party) may be a miner 104M. The querying user could be a consumer 103 such as Alice 103*a*, or a miner node 104M. Nor does a query by a user limit to a manually instigated query. In embodiments the query could be made by an automated process run by the user. For instance the process could be an automated process run by a miner or other node 104 who only wishes to check the payment part of each transaction they are verifying or mining.

Transaction Tree Verification Algorithm

A party (i.e. a verifying user) may perform a verification algorithm $V_F$ which complements the transaction tree generation algorithm F. This verification algorithm will allow a verifier Alice to check whether another party Bob has used the generation algorithm correctly to generate a candidate MTxID. The verification algorithm $V_F$(MTxID,Tx) takes two inputs, Bob's candidate identifier MTxID and the transaction Tx, which is supposed to be identified by MTxID. The algorithm may output either TRUE or FALSE (or some other indication) to indicate whether the candidate identifier MTxID has been generated correctly. The output may be an output to a user via a user device (e.g. as a visual or audio alert).

The verification algorithm may be written as follows:

Inputs: MTxID, Tx
$V_F$(MTxID,Tx):
  1) Calculate TxID: = $H^2$(Tx).
  2) Separate Tx into a set $\mathcal{D}$ of $N = 2^k$ ordered data packets, $\mathcal{D} := \{D_1, D_2, \ldots, D_N\}$, using the same procedure as algorithm F. The calculated TxID is at least one of the packets.
  3) Generate a binary Merkle tree T using the packets of set $\mathcal{D}$ as the leaves and calculate its Merkle root R.
  4) Check R and MTxID for equality:
    4.1 If R = MTxID, return "TRUE".
    4.2 If R ≠ MTxID, return "FALSE".
Output: "TRUE" or "FALSE"

This algorithm applies when the protocol specifies that a binary hash tree should be used to generate the secondary transaction identifier. However in general, as discussed above, any n-ary hash tree may be used.

The querying party (Alice) may obtain the candidate secondary transaction identifier MTxID from the generating user (Bob), or from another node of the network. Alternatively, the verifying party may obtain the candidate MTxID by extracting it from a block of the blockchain (recall that the secondary transaction identifier may be recorded in the generation transaction of the block).

The verification algorithm allows any network peer to independently verify whether the MTxIDs attested to by another peer (e.g. a miner) have been calculated correctly and honestly according to the generation algorithm F. The verifier has knowledge of the generation algorithm F as well as the full transaction data Tx, corresponding to the candidate MTxID, at the point of performing the verification using $V_F$. For example, the generation algorithm and/or the transaction may be distributed amongst the nodes of the network.

Trusting an MTxID

One purpose of generating a secondary transaction identifier MTxID:=R is to allow a lightweight client Alice to verify the existence of a transaction field or data element of interest on the blockchain, without needing to retrieve and interpret the full transaction. However, a publicly-known MTxID cannot necessarily be trusted by a client. For instance, if Alice receives the value of MTxID from an un-trusted party Bob she cannot tell if he has used the correct generation function F. The reason for this is that being able to prove that some data packet $D_i$ is a member of the ordered set $\mathcal{D}$ corresponding to the transaction Tx that is on the blockchain involves two conditions:

1) Prove that $D_i \in \mathcal{D}$, where $\mathcal{D}$ is used to calculate the root hash R=MTxID (as described above).
2) Prove that MTxID corresponds to a mined transaction Tx, identified by TxID.

Performing the hash proof (e.g. a Merkle proof) on a transaction's hash tree T is only sufficient to satisfy the first of these two conditions. The solution to this issue of trusting MTxIDs is referred to as a "layer-2 protocol" that provides a direct, on-chain link between both of the identifiers TxID and MTxID for any given transaction.

The generating user may construct an additional hash tree $T_M$ (a tree of hash trees) and include its root hash $R_M$ as a data element in the script of the generation transaction. The construction of $T_M$ may be done in parallel with the aggregation of transactions as part of the mining process for each new block. The inclusion of $R_M$ only requires a relatively small 32-byte value to be stored in the generation transaction.

The protocol may comprise the following stages:

1) The generating user receives a set $\mathbb{T}=\{Tx_1, Tx_2 \ldots, Tx_N\}$ of N transactions to mine into the next block.
2) Order the set $\mathbb{T}$ for the candidate block according to the existing blockchain protocol.
3) Generate two hash trees:
   - 3.1) Generate the block hash tree $T_B$ using each transaction as a leaf in the order determined by (2), which is done using the standard method for generating a block hash tree. This stage comprises generating, for each transaction, a respective primary transaction identifier by hashing the transaction.
   - 3.2) Generate a tree of transaction hash trees $T_M$ using each transaction's MTxID as a leaf in the order determined by (2). The order of MTxIDs is the same as the order of their corresponding Txs in (3.1) and each is generated using the function $MTxID_i=F(Tx_1)$.
4) Record each root in the candidate block:
   - 4.1) Record the root $R_B$ of the tree $T_B$ in the Merkle_root field of the candidate block header.
   - 4.2) Record the root $R_M$ of the tree $T_M$ in a field of the candidate block generation transaction.

$R_M$ could be recorded in one or more fields of the candidate block generation transaction. For instance, in one of the output scripts of that transaction.

Like the verification algorithm described above, a verifying user may generate a tree of transaction hash trees using the same set of transactions and verify whether the resulting root $R_M$ of the tree $T_M$ is equal to that generated by the generating user.

Figure 7:
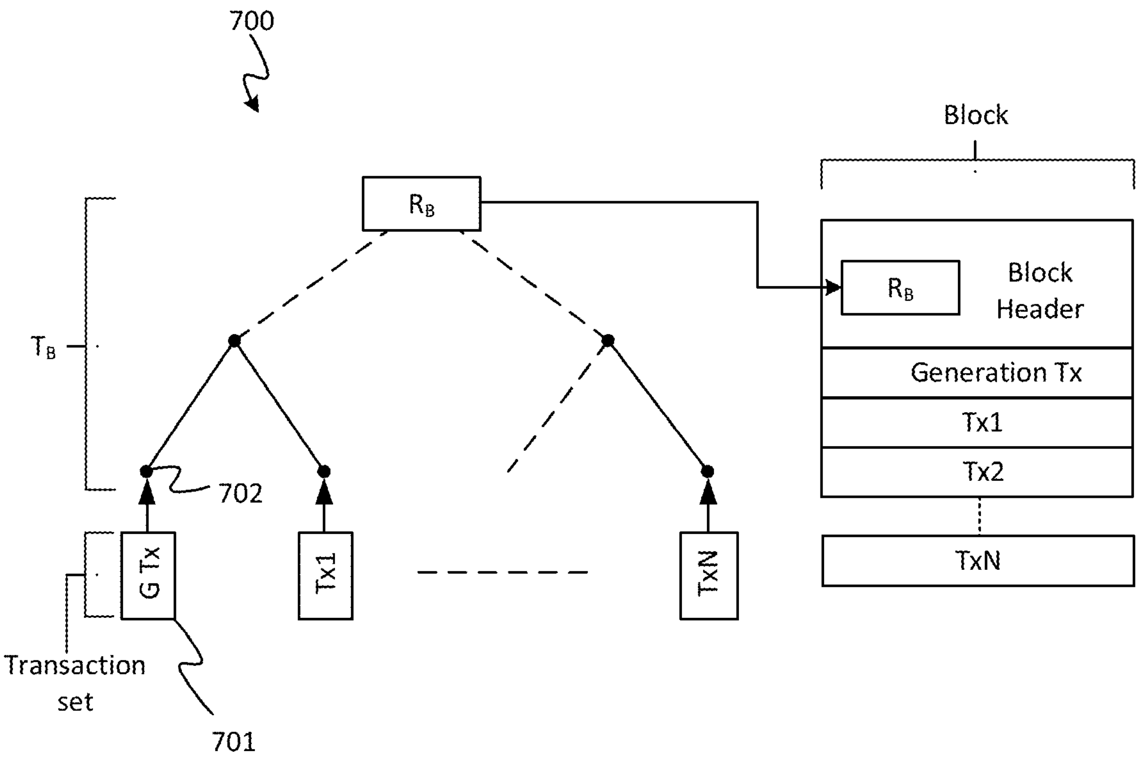
FIG. 7 is a schematic diagram of a block Merkle tree $T_B$, whose root $R_B$ is included in the block header of a valid block.

FIG. 7 illustrates an example block hash tree $T_B$ 700. As shown, each transaction 701 is hashed to form a respective leaf 702 of $T_B$ and the root $R_B$ is included in the block header of a valid block.

Figure 8:
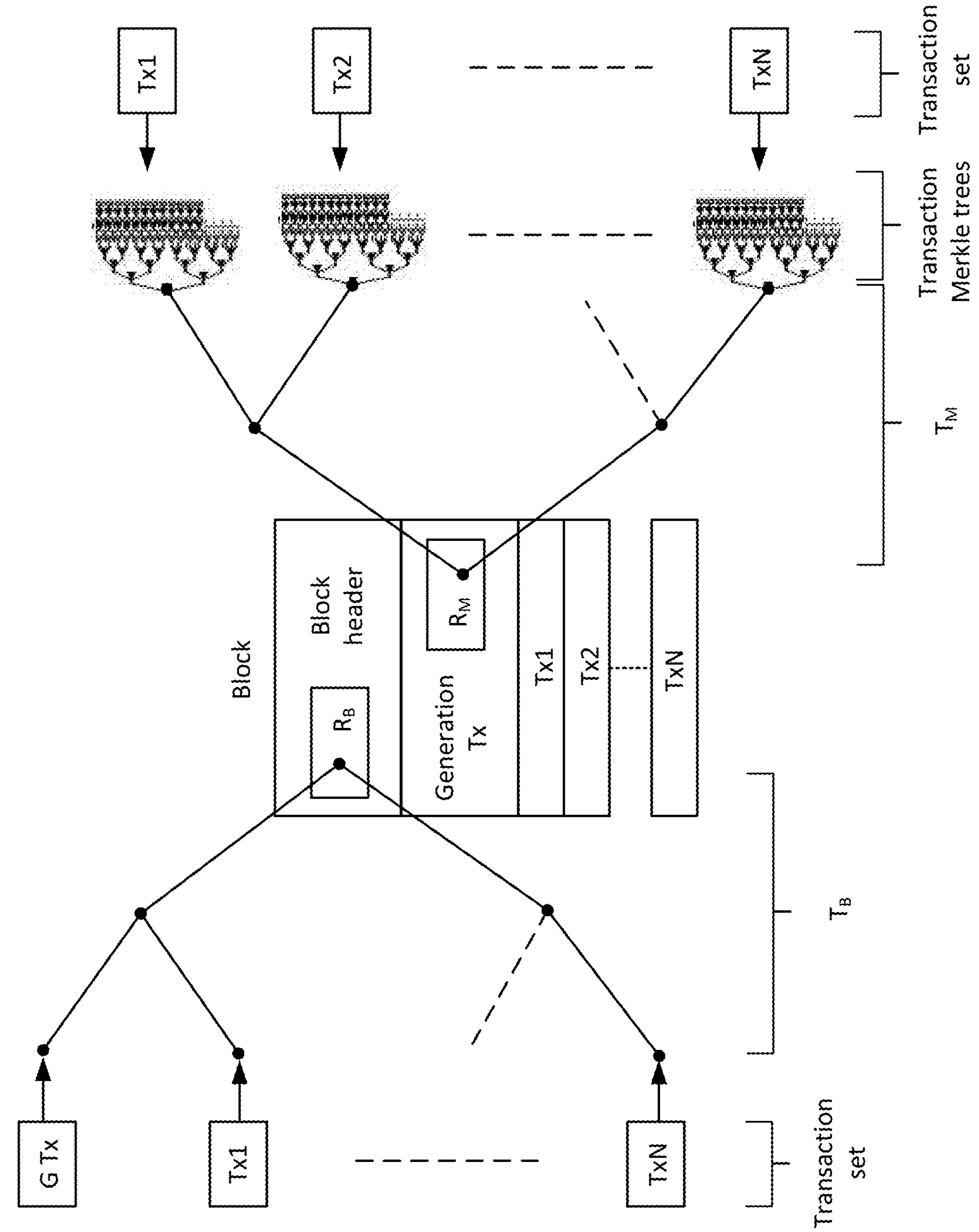
FIG. 8 is a schematic diagram of a block, where the root $R_M$ of a tree of transaction Merkle trees $T_M$ is included in the generation transaction.

FIG. 8 illustrates an example composition of a block, where the root $R_M$ of the tree of transaction hash trees $T_M$ is included in the script field of the generation transaction. The block hash tree $T_B$ is also shown, with its root $R_B$ stored in the block header.

This protocol allows establishes a miner-attested link between the TxIDs of the transactions included in a block with their corresponding MTxIDs. This is because it is always the same miner who creates the list of transactions in a block—expressed in $R_B$—and the list of their corresponding MtxIDs—expressed in $R_T$— all of which is stored on the blockchain. In any block, the proof of work (PoW) consensus algorithm ensures that the value of $R_B$ and the corresponding tree $T_B$ can be trusted. The trust in $R_B$ is used to ensure that the value of $R_M$ is also trusted as it is consistent with the information secured by PoW. The reason for this is that both trees are constructed from the same input data, the set of transactions $\mathbb{T}$, and the set of transactions is the information secured by the PoW consensus algorithm. The required one-to-one correspondence between TxIDs and MTxIDs is therefore verifiable to any network node, including lightweight clients.

As detailed above, a generating user may implement a "layer-2 protocol" in which a secondary block identifier is generated. A layer-2 protocol is a protocol implemented 'on-top' of the base blockchain protocol. The base protocol is not affected (nor even need be 'aware') of such a layer-2 protocol. A layer-2 protocol simply builds something additional to and as an extension of the blockchain protocol.

The secondary block identifier is the root of a transaction set hash tree (or tree of transaction hash trees). Each leaf of the transaction set hash tree may be a secondary transaction identifier of a different transaction within a block (depending on the number of transactions within the block, one or more hash values may be used as padding). The same generating user may generate the secondary transaction identifier and the secondary block identifier. Alternatively, a first generating user may generate the secondary transaction identifier whilst a second, different generating user may generate the secondary block identifier. In some examples only a miner can generate the secondary block identifier. For example, a first generating user may include a secondary transaction identifier within a first transaction and transmit it through the network. Similarly, a second generating user may do the same for a second, different transaction. A third generating user may obtain the secondary transaction identifiers of the first and second transactions, along with those of one or more different transactions, and then generate the secondary block identifier.

Any user (a verifying user) who has access to the transaction(s) that a generating user used to generate a secondary transaction identifier and/or a secondary block identifier may verify whether those identifiers were generated correctly, i.e. according to a protocol of the blockchain. The verifying user may obtain the transaction(s) from, e.g. a source of the transactions or a full or partial copy of the blockchain. The verifying user repeats the same process as what the generating user should have completed if the protocol had been followed correctly. If the secondary transaction identifier matches that produced by the generating user, the verifying user can attest that it has been generated correctly. The same applies for the secondary block identifier.

The secondary transaction identifier(s) and secondary block identifier may be committed to a same transaction or to different transactions to be mined into the blockchain. If the secondary transaction identifier is generated by a miner, the miner may include it in a generation transaction of a block. If the secondary transaction identifier is generated by a user other than a miner, e.g. Alice, that user may include it within a transaction that is propagated through the network to be mined into a block by a miner. As another example, the secondary transaction identifier may be generated by a user that is not connected to the blockchain network but who has access to the target transaction. That user may transmit the secondary transaction identifier to one or more parties (which may or may not be connected to the blockchain network) over e.g. the internet. The secondary transaction identifier (the root of the transaction hash tree) may be recorded in (i.e. written to committed to) the generation transaction of a block (either the same block which contains the target transaction or a different block). The block may then be recorded in the blockchain. The secondary transaction identifier may be committed to a transaction other than generation transaction. For instance, a user may obtain the secondary transaction identifier, include it within a transaction (e.g. a script of the transaction), and transmit that transaction to one or more nodes of the network to be mined into the blockchain. The user who generates the secondary transaction identifier may additionally or alternatively store the identifier in local memory.

The same committing user may commit the secondary transaction identifier and the secondary block identifier for inclusion within a block (the same block or a different block) of the blockchain. Alternatively, a first committing user may commit the secondary transaction identifier to a transaction whilst a second, different committing user may commit the secondary block identifier to a transaction (e.g. to a generation transaction). For example, only a miner can commit the secondary block identifier to a generation transaction whilst other users may include the secondary transaction identifier in a transaction.

Proof-of-Existence

Any individual field of a transaction can be checked to see whether it exists on the blockchain without requiring the full transaction, using the following set of proof-of-existence:

1) Obtain a hash proof for ($D_i$, R, Γ), where R=MTxID. That is, verify that the candidate data field $D_i$ is part of a transaction having R as its secondary identifier.
2) Obtain a hash proof for (MTxID, $R_M$, Γ). That is, verify that the candidate secondary transaction identifier MTxID is part of a tree of hash trees $T_M$ having $R_M$ as its root.
3) Obtain a hash proof for (TxID, $R_B$, Γ). That is, verify that the candidate transaction identifier TxID is part of a block hash tree $T_B$ having $R_B$ as its root.
4) Verify that $R_M$ and $R_B$ are in the same block. This can be ascertained by inspecting the block on the blockchain.

Optionally, the proof-of-existence may comprise verifying that TxID and MTxID are in the same leaf node position in $T_B$ and $T_M$ respectively.

These tests are sufficient to prove that $D_i$ was part of the transaction Tx. In addition, these tests only require a relatively small number of (32-bit) hash values, which is feasible for a lightweight client to be able to handle. This means that any thin client can perform such a lightweight proof-of-existence without needing to obtain full transaction data. Note that the same proof of existence detailed above may be performed on the single (e.g. SHA-256) hash of the data block itself. This would be a proof of existence on $H(D_i)$ rather than $D_i$. In many cases such a proof on the hash of data would be preferable, as it would allow one to effectively prove existence of the data without having to provide or reveal the data itself.

A querying user may want to know whether a candidate data field is part of a transaction included within a block of the blockchain. At the very least the querying user requires a hash of the candidate data field (which may be provided to the user, or the querying user may be provided with the candidate data field which the user then hashes). An authentication path (or hash tree path) for the secondary transaction identifier is also required.

In order to implement the layer-2 proof-of-existence, the querying user also requires a candidate secondary block identifier, and an authentication path for the candidate secondary block identifier. On top of those, a candidate primary transaction identifier of the target transaction, a candidate primary block identifier of the block comprising the set of transactions, and an authentication path for the primary block identifier are also required.

The querying user may be provided with each or some of the above requirements by the generating user or another node of the blockchain network. Alternatively, they may be obtained from the blockchain itself (e.g. from a full or partial copy of the blockchain). As another example, a party separate from the blockchain (e.g. a service provider) may have access to and provide one or more of the requirements.

Accounting for Absent Periods

Miners participating in this protocol will only be able to provide the network with the valuable MTxID information—encoded in $R_M$— for blocks which are mined by them. In some cases not every miner will participate in the protocol. A miner M participating in the protocol can include another (32-byte) hash value $R_M^{Inter}$ in the script field of its generation transaction. The value $R_M^{Inter}$ is the root of a third hash tree $T_M^{Inter}$. This additional tree is constructed in the same way as $T_M$ but instead uses the MTxIDs for every transaction that has been mined—in the order in which they were mined—during the interim period between blocks that were successfully mined by M. Although this requires an additional 32-byte to be stored by the miner in their generation transaction, it does mean that they can provide trusted MTxIDs, and therefore lightweight proofs-of-existence, without the participation of other miners. This is again because all of the necessary information for validation is stored on-chain.

Example Use Case

Figure 9A:
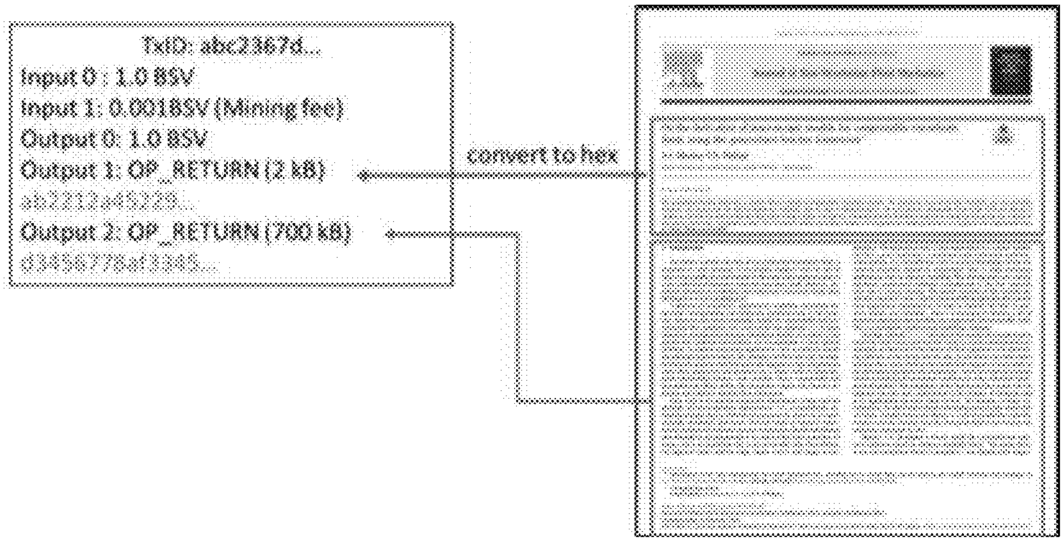
FIGS. 9*a* and 9*b* illustrate respectively a full and lightweight version of an example academic paper data stored in a transaction.
Figure 9B:
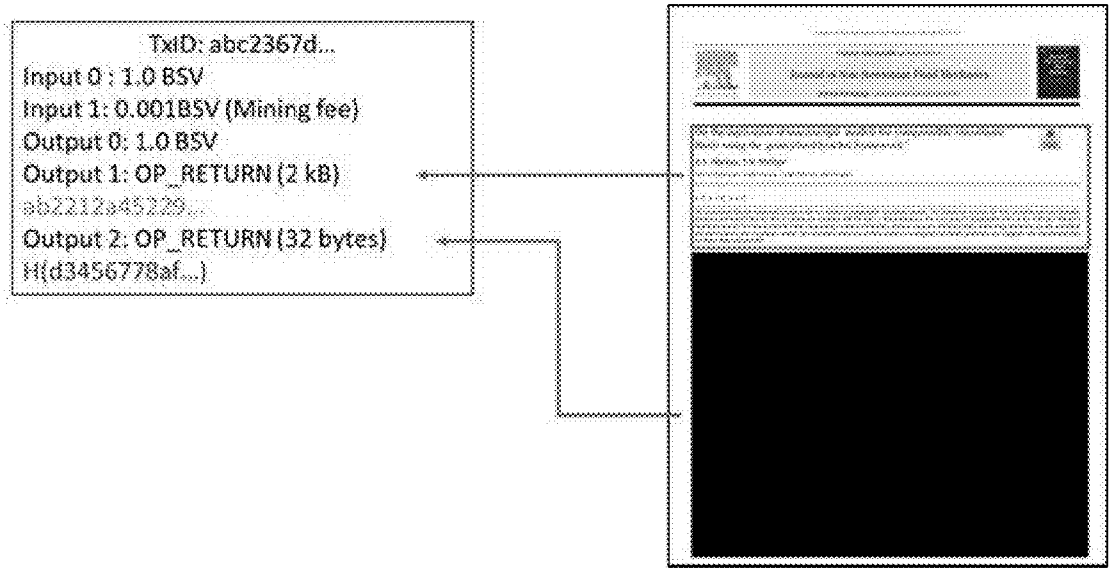

With reference to FIGS. 9*a* and 9*b*, the following provides an example in which a generating user wishes to verify whether a transaction comprises a candidate data field.

Transactions can be used to store content data, unrelated to digital asset transfers. E.g. some transactions may contain data in OP_RETURN scriptPubkey fields that may not relate to the digital asset receiver's address. Because of this decoupling of content data from data explicitly related to digital asset transfers, in many cases a user may only want to verify a transaction snippet exists within the blockchain without wanting to download full transaction data.

Let Alice be an SPV node that keeps a record of block header information and generation script data from the generation transactions of miners participating in the described protocols. Let Bob be such a miner, who also has a full copy of the blockchain. Consider a transaction Tx1 on the blockchain, which contains a digital version of an academic paper. The data for the document is contained in two separate OP_RETURN outputs scriptPubKey fields, whereby the title and abstract are contained in the first OP_RETURN (output 1) and the rest of the article is contained in the second OP_RETURN (output 2) according to FIG. 9*a*.

Alice knows the TxID for Tx1 but does not have the full transaction data. Alice wants to have access to Tx1 and so requests it from Bob, however Bob wants to be paid in return for providing the full transaction data to Alice. Alice on the other hand does not want to pay Bob before being certain that the transaction data she will receive will contain the paper. Bob can provide this certainty by sending Alice a preview along with a lightweight proof of existence. Bob first sends Alice the transaction data in Tx1 minus the bulk of the article and replaces the data following the second OP_RETURN (output 2) with the SHA256 hash of the data (see FIG. 9*b*).

On the one hand Alice wants to verify that the title and abstract (transaction snippet) she receives has not been altered but Bob does not want to provide the entire transaction. Bob needs to prove that the data that Alice received is stored on the blockchain without requiring Alice to download the transaction or any other data than her SPV wallet can provide (block headers and generation data).

Lightweight proof-of-existence can be used to verify that the lightweight version of Tx1 sent by Bob has not been altered (i.e. it is from the blockchain). Along with the lightweight Tx1, Bob provides a hash proof, i.e. Bob provides a sequence hashes according to the method outline above that will enable Alice to verify the data she received against the tree root, $R_M$, stored in the generation transaction from the block that Tx1 is stored in (see FIG. 9*a*). Since Alice has $R_M$ she can perform a hash proof to verify the integrity of the data sent by Bob.

Convinced that Bob has sent her a snippet of the full academic paper, Alice may wish to view the entire transaction, in which case she can request the full transaction data. On receiving the missing data (i.e. the full transaction) Alice can do one last check by checking that the data in the second OP_RETURN (output 2) hashes to the same string as the OP_RETURN (output 2) data given in the lightweight transaction. Alternatively, Alice can hash the entire transaction and check against the TxID she had at the beginning.

As another example, a party may wish to prune data from the transaction. For instance, to comply with personal data requirements, or to save on storage space. However, the party may still need to prove to others that the transaction contained a candidate data field (e.g. a spendable output of the transaction). The secondary transaction identifier of the transaction allows any party to verify whether the pruned transaction contained the candidate data field. The pruned data (e.g. personal information) may be replaced with a hash of the pruned data. A likely candidate for pruning is OP_RETURN data or script fields due to the increased amount of data that they can store. Therefore if a node wishes to verify whether a pruned transaction comprises a candidate data field, the party can be provided with the hash of the pruned data for use as a leaf node in a hash tree.

It will be appreciated that the above embodiments have been described by way of example only.

According to a first instantiation of the teachings disclosed herein there is provided a computer-implemented method of generating a secondary transaction identifier of a target transaction, the secondary transaction identifier enabling a querying user to determine whether the target transaction comprises a candidate data field; the method being performed by a generating user and comprising: identifying a set of data fields of the target transaction, each data field comprising respective data of the transaction; and generating a transaction hash tree, wherein the transaction hash tree comprises: i) a leaf layer comprising a plurality of leaf hashes, wherein each data field is hashed to generate a respective one of the plurality of leaf hashes, ii) one or more internal layers each comprising a plurality of internal hashes, wherein each internal hash in each internal layer is generated by hashing a concatenation of at least two hashes from a lower layer, each internal hash of a lowermost internal layer of the one or more internal layers being generated by hashing a concatenation of at least two different leaf hashes, and iii) a root layer comprising the secondary transaction identifier, wherein the secondary transaction identifier is generated by hashing a concatenation of the internal hashes of an uppermost internal layer of the one or more internal layers.

In some examples, the method may comprise receiving said transaction from one or more nodes of a blockchain network. E.g. one or more end-users. The transactions may be transactions of a UTXO-based model. Alternatively they may be transactions of an account-based model.

In some examples, each set of internal hashes consists of a single hash (e.g. the hash thee is a binary hash tree). Alternatively, each set of internal hashes may comprise two or more hashes (e.g. two hashes if the hash tree is a ternary hash tree).

According to a second, optional instantiation, there may be provided a method in accordance with the first instantiation, wherein the method may comprise committing the secondary transaction identifier to the blockchain.

The generating user may be a miner at a node of the blockchain network. The querying user may be an end-user, a miner, or a different type of node of the network.

According to a third, optional instantiation, there may be provided a method in accordance with the first or second instantiations, wherein the method may comprise one, some or all of: committing the secondary transaction identifier to a transaction for inclusion within a block of the blockchain; committing the secondary transaction identifier to a generation transaction for inclusion within a block of the blockchain; transmitting the secondary transaction identifier to a node of a blockchain network; and storing the secondary transaction identifier in memory of computing apparatus of the generating user.

The generation transaction may be a logically first transaction in the block.

According to a fourth instantiation of the teachings disclosed herein there is provided a method of enabling a querying user to determine whether a target transaction within a block of a blockchain comprises a candidate data field; the method being performed by a committing user and comprising: obtaining a secondary transaction identifier of the target transaction; and committing the secondary transaction identifier to a transaction for inclusion within a block of the blockchain, wherein the secondary transaction identifier has been generated by: identifying a set of data fields of the target transaction, each data field comprising respective data of the transaction; and generating a transaction hash tree, wherein the transaction hash tree comprises: i) a leaf layer comprising a plurality of leaf hashes ordered based on the ordered set of data fields, wherein each data field is hashed to generate a respective one of the plurality of leaf hashes, ii) one or more internal layers each comprising a plurality of internal hashes, wherein each internal hash in each internal layer is generated by hashing a concatenation of at least two hashes from a lower layer, each internal hash of a lowermost internal layer of the one or more internal layers being generated by hashing a concatenation of at least two different leaf hashes, and iii) a root layer comprising the secondary transaction identifier, wherein the secondary transaction identifier is generated by hashing a concatenation of the internal hashes of an uppermost internal layer of the one or more internal layers.

According to a fifth, optional instantiation, there may be provided a method in accordance with the fourth instantiation, wherein said obtaining may comprise at least one of: generating the secondary transaction identifier; receiving the secondary transaction identifier from a node of a blockchain network; receiving the secondary transaction identifier from a node external to the blockchain network.

According to a sixth, optional instantiation, there may be provided a method in accordance with the fourth or fifth instantiations, wherein said committing may comprise committing the secondary transaction identifier to a generation transaction within a block of the blockchain.

According to a seventh, optional instantiation, there may be provided a method in accordance with any of the first to sixth instantiations, wherein the transaction hash tree may be a binary hash tree, wherein each internal hash of the lowermost internal layer is generated by hashing a concatenation of two different leaf hashes, each internal hash of each internal layer is generated by hashing a concatenation of two hashes from a lower layer, and wherein the uppermost internal layer comprises two internal hashes.

In the case where the hash tree is a binary hash tree, each set of internal hashes consists of a single internal hash.

According to an eighth, optional instantiation, there may be provided a method in accordance with any of the first to seventh instantiations, wherein the method may comprise transmitting an authentication path for the candidate data field to the querying user, wherein the authentication path comprises an ordered set of hashes, and wherein the ordered set of hashes comprises at least one leaf hash and one or more sets of internal hashes, each set of internal hashes belonging to a respective one of the internal layers of the transaction hash tree.

According to a ninth, optional instantiation, there may be provided a method in accordance with any of the first to eighth instantiations, wherein the method may comprise transmitting the candidate data field or a hash thereof but not at least one other data field of the target transaction to the querying party.

For instance, the same node may transmit both the candidate data field and the secondary transaction identifier. The node may be a trusted node.

In some examples, only the candidate field and not any other data field of the target transaction is transmitted to the querying party.

According to a tenth, optional instantiation, there may be provided a method in accordance with any of the first to ninth instantiations, wherein the set of data fields may comprise: i) at least one data field comprising input data of the target transaction; ii) at least one data field comprising output data of the target transaction; and iii) at least one data field comprising non-input and non-output data of the target transaction.

In some examples, each data field may comprise only one type of data, e.g. input data, output data or other data (i.e. non-input & non-output data).

According to an eleventh, optional instantiation, there may be provided a method in accordance with any of the first to tenth instantiations, wherein the set of data fields may comprise: i) at least one data field comprising script input data of the target transaction; ii) at least one data field comprising non-script input data of the target transaction; iii) at least one data field comprising script output data of the target transaction; and iv) at least one data field comprising non-script output data of the target transaction.

According to a twelfth, optional instantiation, there may be provided a method in accordance with any of the first to eleventh instantiations, wherein one or both of: the target transaction may comprise data corresponding to multiple inputs, and wherein the set of data fields comprises, for each one of the inputs: at least one data field comprising script data of that input, and at least one data field comprising non-script data of that input; and/or the target transaction may comprise data corresponding to multiple outputs, and wherein the set of data fields comprises, for each one of the outputs: at least one data field comprising script data of that output, and at least one data field comprising non-script data of that output.

According to a thirteenth, optional instantiation, there may be provided a method in accordance with any of the first to twelfth instantiations, wherein the set of data fields may comprise: i) at least one data field comprising one or more signatures; ii) at least one data field comprising script input data of the target transaction other than signatures; iii) at least one data field comprising one or more public key hashes; iv) at least one data field comprising script output data of the target transaction other than public key hashes.

According to a fourteenth, optional instantiation, there may be provided a method in accordance with any of the first to thirteenth instantiations, wherein at least one of the set of data fields may comprise a primary transaction identifier of the target transaction, and/or at least one of the data fields is appended with the primary transaction identifier of the target transaction.

In some examples, each data field may be appended with the primary transaction identifier. Alternatively, each data field that does not comprise the primary transaction identifier may be appended with the primary transaction identifier.

According to a fifteenth, optional instantiation, there may be provided a method in accordance with any of the first to fourteenth instantiations, wherein the primary transaction identifier may be generated by hashing the target transaction.

The primary transaction identifier may be generated by double-hashing the target transaction.

According to a sixteenth, optional instantiation, there may be provided a method in accordance with any of the first to fifteenth instantiations, wherein said identifying may comprise identifying a set of a fixed number of data fields.

According to a seventeenth, optional instantiation, there may be provided a method in accordance with any of the first to fifteenth instantiations, wherein said identifying may comprise identifying a set of data fields each comprising a fixed amount of data.

According to a eighteenth, optional instantiation, there may be provided a method in accordance with any of the first to seventeenth instantiations, wherein the target transaction may comprise content data, and wherein the candidate data field comprises at least part of that content data.

According to a nineteenth, optional instantiation, there may be provided a method in accordance with any of the first to eighteenth instantiations, wherein the content data comprises one, some or all of: image data; sound data; video data; and text data.

According to a twentieth instantiation of the teachings disclosed herein there is provided computer equipment, comprising: memory comprising one or more memory units; and processing apparatus comprising one or more processing units, wherein the memory stores code arranged to run on the processing apparatus, the code being configured so as when on the processing apparatus to perform the method of any of the first to third instantiations and/or any of the eighth to nineteenth instantiations.

According to a twenty first instantiation of the teachings disclosed herein there is provided a computer program embodied on computer-readable storage and configured so as, when run on computer equipment, to perform the method of any of the first to third instantiations and/or any of the eighth to nineteenth instantiations.

According to a twenty second instantiation of the teachings disclosed herein there is provided computer equipment, comprising: memory comprising one or more memory units; and processing apparatus comprising one or more processing units, wherein the memory stores code arranged to run on the processing apparatus, the code being configured so as when on the processing apparatus to perform the method of any of the fourth to nineteenth instantiations.

According to a twenty third instantiation of the teachings disclosed herein there is provided a computer program embodied on computer-readable storage and configured so as, when run on computer equipment, to perform the method of any of the fourth to nineteenth instantiations.

According to a twenty fourth instantiation of the teachings disclosed herein there is provided a computer-implemented method of verifying whether a candidate secondary transaction identifier of a target transaction within a block of a blockchain has been generated according to a specified protocol, the method performed by a verifying user and comprising: obtaining the candidate secondary transaction identifier; identifying a set of data fields of the target transaction, each data field comprising respective data of the transaction; generating a transaction hash tree, wherein the transaction hash tree comprises: i) a leaf layer comprising a plurality of leaf hashes, wherein each data field is hashed to generate a respective leaf hash, ii) one or more internal layers each comprising a plurality of internal hashes, wherein each internal hash in each internal layer is generated by hashing a concatenation of at least two hashes from a lower layer, each internal hash of a lowermost internal layer being generated by hashing a concatenation of at least two different leaf hashes, and iii) a root layer comprising the secondary transaction identifier, wherein the secondary transaction identifier is generated by hashing a concatenation of the internal hashes of an uppermost internal layer; and verifying whether the secondary transaction identifier matches the candidate secondary transaction identifier.

According to a twenty fifth, optional instantiation, there may be provided a method in accordance with the twenty fourth instantiation, wherein said obtaining may comprise one or more of: receiving the candidate secondary transaction identifier from a node of a blockchain network; receiving the candidate secondary transaction identifier from a node external to the blockchain network; and extracting the candidate secondary transaction identifier from a transaction within a block of the blockchain.

According to a twenty sixth instantiation of the teachings disclosed herein there is provided computer equipment, comprising: memory comprising one or more memory units; and processing apparatus comprising one or more processing units, wherein the memory stores code arranged to run on the processing apparatus, the code being configured so as when on the processing apparatus to perform the method of any of the twenty fourth and twenty fifth instantiations.

According to a twenty seventh instantiation of the teachings disclosed herein there is provided a computer program embodied on computer-readable storage and configured so as, when run on computer equipment, to perform the method of any of the twenty fourth and twenty fifth instantiations.

According to a twenty eighth instantiation of the teachings disclosed herein there is provided a computer-implemented method of determining whether a target transaction within a block of a blockchain comprises a candidate data field, the method being performed by a querying user and comprising: obtaining a candidate leaf hash, wherein the candidate leaf hash is a hash of the candidate data field; obtaining a candidate secondary transaction identifier of the target transaction, wherein the secondary transaction identifier has been generated by identifying a set of data fields of the target transaction, each data field comprising respective data of the transaction, and generating a transaction hash tree, wherein a root layer of the transaction hash tree comprises the secondary transaction identifier; obtaining an authentication path for the candidate data field, wherein the authentication path comprises an ordered set of hashes, and wherein the ordered set of hashes comprises at least one leaf hash and one or more sets of internal hashes, each set of internal hashes belonging to a respective internal layer of the transaction hash tree; and performing a hash tree proof using the obtained candidate leaf hash, the obtained candidate secondary transaction identifier, and the obtained authentication path for the candidate data field, said performing generating a secondary transaction identifier; herein said determination is based on whether the whether the secondary transaction identifier matches the candidate secondary transaction identifier.

In some examples, said obtaining of the hash of the candidate data field may comprise obtaining the candidate data field and hashing said candidate data field. Alternatively, said obtaining may comprise receiving the hash of the candidate data field, e.g. from the recording party or another node.

According to a twenty ninth, optional instantiation, there may be provided a method in accordance with the twenty eighth instantiation, wherein said performing of the hash tree proof may comprise: hashing a concatenation of the candidate leaf hash with the at least one leaf hash in the ordered set of hashes; and then, repeating a process of hashing a concatenation of the result of the previous hashing with a next one of the one or more sets of internal hashes in the authentication path until a final one of the one or more sets of internal hashes has been hashed after being concatenated with the previous hashing, wherein the secondary transaction identifier is a result of the final hashing.

According to a thirtieth, optional instantiation, there may be provided a method in accordance with the twenty eighth or twenty ninth instantiations, wherein said obtaining of the candidate leaf hash may comprise: receiving the candidate leaf hash; or receiving the candidate data field and hashing the candidate data field to generate the candidate leaf hash.

According to a thirty first, optional instantiation, there may be provided a method in accordance with any of the twenty eighth to thirtieth instantiations, wherein said obtaining of the candidate secondary transaction identifier may comprise at least one of: receiving the secondary transaction identifier from a node of the blockchain network; receiving the secondary transaction identifier from a node external to the blockchain network; and extracting the secondary transaction identifier from a transaction within a block of the blockchain.

According to a thirty second instantiation of the teachings disclosed herein there is provided computer equipment, comprising: memory comprising one or more memory units; and processing apparatus comprising one or more processing units, wherein the memory stores code arranged to run on the processing apparatus, the code being configured so as when on the processing apparatus to perform the method of any of the twenty eighth to thirty first instantiations.

According to a thirty third instantiation of the teachings disclosed herein there is provided a computer program embodied on computer-readable storage and configured so as, when run on computer equipment, to perform the method of any of the twenty eighth to thirty first instantiations.

According to a thirty fourth instantiation of the teachings disclosed herein there is provided a computer-implemented method of generating a secondary block identifier of a block of a blockchain, wherein the block comprises a set of transactions, the secondary block identifier enabling a querying user to determine whether the set of transactions comprises a candidate data field; the method being performed by a generating user and comprising: for each transaction in the set of transactions, obtaining a respective secondary transaction identifier; and generating a transaction set hash tree, wherein the transaction set hash tree comprises: i) a leaf layer comprising a plurality of leaf hashes, wherein each leaf hash corresponds to a respective one of the secondary transaction identifiers, ii) one or more internal layers each comprising a plurality of internal hashes, wherein each internal hash in each internal layer is generated by hashing a concatenation of at least two hashes from a lower layer, each internal hash of a lowermost internal layer of the one or more internal layers being generated by hashing a concatenation of at least two different leaf hashes, and iii) a root layer comprising the secondary block identifier, wherein the secondary block identifier is generated by hashing a concatenation of the internal hashes of an uppermost internal layer of the one or more internal layers.

The primary block identifier may also be referred to as a primary block Merkle root. The secondary block identifier may also be referred to as a secondary block Merkle root.

According to a thirty fifth, optional instantiation, there may be provided a method in accordance with the thirty fourth instantiation, wherein the method may comprise one, some or all of: committing the secondary block identifier to a transaction for inclusion within a block of the blockchain; committing the secondary block identifier to a generation transaction for inclusion within a block of the blockchain; transmitting the secondary block identifier to a node of a blockchain network; and storing the secondary transaction identifier in memory of computing apparatus of the generating user.

In some examples, the block hash tree and/or the transaction set hash trees are binary hash trees.

According to a thirty sixth, optional instantiation, there may be provided a method in accordance with the thirty fourth or thirty fifth instantiations, wherein said obtaining of the respective secondary transaction identifiers may comprise one or more of: generating one, some, or all of the respective secondary transaction identifiers; receiving one, some, or all of the respective secondary transaction identifiers from a node of the blockchain network; receiving one, some, or all of the respective secondary transaction identifiers from a node external to the blockchain network; extracting one, some, or all of the respective secondary transaction identifiers from at least one transaction within a block of the blockchain.

According to a thirty seventh instantiation of the teachings disclosed herein there is provided computer equipment, comprising: memory comprising one or more memory units; and processing apparatus comprising one or more processing units, wherein the memory stores code arranged to run on the processing apparatus, the code being configured so as when on the processing apparatus to perform the method of any of the thirty fourth to thirty sixth instantiations.

According to a thirty eighth instantiation of the teachings disclosed herein there is provided a computer program embodied on computer-readable storage and configured so as, when run on computer equipment, to perform the method of any of the thirty fourth to thirty sixth instantiations.

According to a thirty ninth instantiation of the teachings disclosed herein there is provided a method of enabling a querying user to determine whether a set of transactions within a block of a blockchain comprises a candidate data field; the method being performed by a committing user and comprising: obtaining a secondary block identifier of the block that comprises the set of transactions; and committing the secondary block identifier to a transaction for inclusion within a block of the blockchain, wherein the secondary block identifier has been generated by: for each transaction in the set of transactions, obtaining a respective secondary transaction identifier; and generating a transaction set hash tree, wherein the transaction set hash tree comprises: i) a leaf layer comprising a plurality of leaf hashes, wherein each leaf hash corresponds to a respective one of the secondary transaction identifiers, ii) one or more internal layers each comprising a plurality of internal hashes, wherein each internal hash in each internal layer is generated by hashing a concatenation of at least two hashes from a lower layer, each internal hash of a lowermost internal layer of the one or more internal layers being generated by hashing a concatenation of at least two different leaf hashes, and iii) a root layer comprising the secondary block identifier, wherein the secondary block identifier is generated by hashing a concatenation of the internal hashes of an uppermost internal layer of the one or more internal layers.

According to a fortieth, optional instantiation, there may be provided a method in accordance with the thirty ninth instantiation, wherein said committing may comprise committing the secondary transaction identifier to a generation transaction within a block of the blockchain.

According to a forty first, optional instantiation, there may be provided a method in accordance with the thirty ninth or fortieth instantiations, wherein the method may comprise: obtaining a primary block identifier of the block that comprises the set of transactions; and committing the secondary transaction identifier to the generation transaction of the block of the blockchain; wherein said primary block identifier is generated by: for each transaction in the set of transactions, generating a respective primary transaction identifier by hashing that transaction; and generating a block hash tree, wherein the block hash tree comprises: i) a leaf layer comprising a plurality of leaf hashes, wherein each leaf hash corresponds to one of the primary transaction identifiers, ii) one or more internal layers each comprising a plurality of internal hashes, wherein each internal hash in each internal layer is generated by hashing a concatenation of at least two hashes from a lower layer, each internal hash of a lowermost internal layer of the one or more internal layers being generated by hashing a concatenation of at least two different leaf hashes, and iii) a root layer comprising the block identifier, wherein the block identifier is generated by hashing a concatenation of the internal hashes of an uppermost internal layer of the one or more internal layers.

According to a forty second instantiation of the teachings disclosed herein there is provided computer equipment, comprising: memory comprising one or more memory units; and processing apparatus comprising one or more processing units, wherein the memory stores code arranged to run on the processing apparatus, the code being configured so as when on the processing apparatus to perform the method of any of the thirty ninth to forty first instantiations.

According to a forty third instantiation of the teachings disclosed herein there is provided a computer program embodied on computer-readable storage and configured so as, when run on computer equipment, to perform the method of any of the thirty ninth to forty first instantiations.

According to a forty fourth instantiation of the teachings disclosed herein there is provided a computer-implemented method of verifying whether a candidate secondary block identifier of a block of a blockchain has been generated according to a specified protocol, wherein the block comprises a set of transactions, wherein the method is performed by a verifying user and comprises: obtaining the candidate secondary block identifier; for each transaction in the set of transactions, obtaining a respective secondary transaction identifier; generating a transaction set hash tree, wherein the transaction set hash tree comprises: i) a leaf layer comprising a plurality of leaf hashes, wherein each leaf hash corresponds to a respective one of the secondary transaction identifiers, ii) one or more internal layers each comprising a plurality of internal hashes, wherein each internal hash in each internal layer is generated by hashing a concatenation of at least two hashes from a lower layer, each internal hash of a lowermost internal layer of the one or more internal layers being generated by hashing a concatenation of at least two different leaf hashes, and iii) a root layer comprising the secondary block identifier, wherein the secondary block identifier is generated by hashing a concatenation of the internal hashes of an uppermost internal layer of the one or more internal layers; and verifying whether the secondary block identifier matches the candidate secondary block identifier.

According to a forty fifth, optional instantiation, there may be provided a method in accordance with the forty fourth instantiation, wherein said obtaining may comprise one or more of: receiving the candidate secondary block identifier from a node of a blockchain network; receiving the candidate secondary block identifier from a node external to the blockchain network; and extracting the candidate secondary block identifier from a transaction of a block of the blockchain.

According to a forty sixth instantiation of the teachings disclosed herein there is provided computer equipment, comprising: memory comprising one or more memory units; and processing apparatus comprising one or more processing units, wherein the memory stores code arranged to run on the processing apparatus, the code being configured so as when on the processing apparatus to perform the method of any of the forty fourth to forty fifth instantiations.

According to a forty seventh instantiation of the teachings disclosed herein there is provided a computer program embodied on computer-readable storage and configured so as, when run on computer equipment, to perform the method of any of the forty fourth to forty fifth instantiations.

According to a forty eighth instantiation of the teachings disclosed herein there is provided a computer-implemented method of determining whether a block of a blockchain comprises a target transaction that comprises a candidate data field, wherein the block comprises a set of transactions including said target transaction, the method being performed by a querying user and comprising: obtaining i) a candidate leaf hash, wherein the candidate leaf hash is a hash of the candidate data field, ii) a candidate secondary transaction identifier of the target transaction, and iii) an authentication path for the candidate data field; performing a hash tree proof using i), ii) and iii) to generate a secondary transaction identifier; obtaining iv) a candidate secondary block identifier, and v) an authentication path for the candidate secondary block identifier; performing a hash tree proof using iv), v) and the generated secondary transaction identifier to generate a secondary block identifier; obtaining vi) a candidate primary transaction identifier of the target transaction, vii) a candidate primary block identifier of the block comprising the set of transactions, and viii) an authentication path for the primary block identifier; and performing a hash tree proof using vi), vii, and viii) to generate a primary block identifier; wherein said determination is based on whether: a) the generated secondary transaction identifier matches the candidate secondary transaction identifier, b) the generated secondary block identifier matches the candidate secondary block identifier, and c) the generated primary block identifier matches the candidate primary block identifier.

According to a forty ninth, optional instantiation, there may be provided a method in accordance with the forty eighth instantiation, wherein said determination may be further based on whether the block comprising the set of transactions comprises said candidate primary block identifier and said candidate secondary block identifier.

According to a fiftieth instantiation of the teachings disclosed herein there is provided computer equipment, comprising: memory comprising one or more memory units; and processing apparatus comprising one or more processing units, wherein the memory stores code arranged to run on the processing apparatus, the code being configured so as when on the processing apparatus to perform the method of any of the forty eighth to forty ninth instantiations.

According to a fifty first instantiation of the teachings disclosed herein there is provided a computer program embodied on computer-readable storage and configured so as, when run on computer equipment, to perform the method of any of the forty eighth to forty ninth instantiations.

According to another instantiation disclosed herein, there may be provided a method comprising the actions of the generating user, querying user, any third party that may be involved, and the network of nodes.

According to another instantiation disclosed herein, there may be provided a system comprising the computer equipment of the generating user, the computer equipment of the committing user, the computer equipment of the verifying user, the computer equipment of the querying user, the computer equipment of any third party, and the network of nodes.

Other variants or use cases of the disclosed techniques may become apparent to the person skilled in the art once given the disclosure herein. The scope of the disclosure is not limited by the described embodiments but only by the accompanying claims.

The invention claimed is:

1. A computer-implemented method of generating a secondary block identifier of a block of a blockchain, wherein the block comprises a set of blockchain transactions, the secondary block identifier enabling a querying user to determine whether the set of blockchain transactions comprises a candidate data field; the method being performed by a generating user and comprising:

for each blockchain transaction in the set of blockchain transactions, obtaining a respective secondary transaction identifier; and generating a transaction set hash tree, wherein the transaction set hash tree comprises:

i) a leaf layer comprising a plurality of leaf hashes, wherein each leaf hash corresponds to a respective one of the secondary transaction identifiers, ii) one or more internal layers each comprising a plurality of internal hashes, wherein each internal hash in each internal layer is generated by hashing a concatenation of at least two hashes from a lower layer, each internal hash of a lowermost internal layer of the one or more internal layers being generated by hashing a concatenation of at least two different leaf hashes, and iii) a root layer comprising the secondary block identifier, wherein the secondary block identifier is generated by hashing a concatenation of the internal hashes of an uppermost internal layer of the one or more internal layers.

2. The method of claim 1, comprising one, some or all of:

committing the secondary block identifier to a blockchain transaction for inclusion within a block of the blockchain;

committing the secondary block identifier to a generation transaction for inclusion within a block of the blockchain;

transmitting the secondary block identifier to a node of a blockchain network; and storing the secondary transaction identifier in memory of computing apparatus of the generating user.

3. The method of claim 1, wherein said obtaining of the respective secondary transaction identifiers comprises one or more of:

generating one, some, or all of the respective secondary transaction identifiers;

receiving one, some, or all of the respective secondary transaction identifiers from a node of a blockchain network;

receiving one, some, or all of the respective secondary transaction identifiers from a node external to the blockchain network;

extracting one, some, or all of the respective secondary transaction identifiers from at least one transaction within a block of the blockchain.

4. A computer-implemented method of enabling a querying user to determine whether a set of blockchain transactions within a block of a blockchain comprises a candidate data field; the method being performed by a committing user and comprising:

obtaining a secondary block identifier of the block that comprises the set of blockchain transactions; and committing the secondary block identifier to a blockchain transaction for inclusion within a block of the blockchain, wherein the secondary block identifier has been generated by:

for each blockchain transaction in the set of blockchain transactions, obtaining a respective secondary transaction identifier; and generating a transaction set hash tree, wherein the transaction set hash tree comprises:

i) a leaf layer comprising a plurality of leaf hashes, wherein each leaf hash corresponds to a respective one of the secondary transaction identifiers, ii) one or more internal layers each comprising a plurality of internal hashes, wherein each internal hash in each internal layer is generated by hashing a concatenation of at least two hashes from a lower layer, each internal hash of a lowermost internal layer of the one or more internal layers being generated by hashing a concatenation of at least two different leaf hashes, and iii) a root layer comprising the secondary block identifier, wherein the secondary block identifier is generated by hashing a concatenation of the internal hashes of an uppermost internal layer of the one or more internal layers.

5. The method of claim 4, wherein said committing comprises committing the secondary transaction identifier to a generation transaction within a block of the blockchain.

6. The method of claim 4, comprising:

obtaining a primary block identifier of the block that comprises the set of transactions; and committing the secondary transaction identifier to the generation transaction of the block of the blockchain;

wherein said primary block identifier is generated by:

for each blockchain transaction in the set of blockchain transactions, generating a respective primary transaction identifier by hashing that blockchain transaction; and generating a block hash tree, wherein the block hash tree comprises:

i) a leaf layer comprising a plurality of leaf hashes, wherein each leaf hash corresponds to one of the primary transaction identifiers, ii) one or more internal layers each comprising a plurality of internal hashes, wherein each internal hash in each internal layer is generated by hashing a concatenation of at least two hashes from a lower layer, each internal hash of a lowermost internal layer of the one or more internal layers being generated by hashing a concatenation of at least two different leaf hashes, and iii) a root layer comprising the block identifier, wherein the block identifier is generated by hashing a concatenation of the internal hashes of an uppermost internal layer of the one or more internal layers.

* * * * *